(12) United States Patent
Lantz et al.

(10) Patent No.: US 12,014,755 B1
(45) Date of Patent: Jun. 18, 2024

(54) SIDE ERASURE CONTROL FOR TRACK WRITING IN A SYSTEM

(71) Applicant: INTERNATIONAL BUSINESS MACHINES CORPORATION, Armonk, NY (US)

(72) Inventors: Mark Alfred Lantz, Adliswil (CH); Hugo E. Rothuizen, Oberrieden (CH); Simeon Furrer, Altdorf (CH); Stella Brach, Oberrieden (CH); Jason Liang, Campbell, CA (US); Icko E. T. Iben, Santa Clara, CA (US); Georg Lothar Lauhoff, San Jose, CA (US); David Lee Swanson, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/362,337

(22) Filed: Jul. 31, 2023

(51) Int. Cl.
*G11B 5/584* (2006.01)
*G11B 5/008* (2006.01)

(52) U.S. Cl.
CPC ...... *G11B 5/00873* (2013.01); *G11B 5/00817* (2013.01); *G11B 2220/95* (2013.01)

(58) Field of Classification Search
CPC . G11B 5/584; G11B 5/00826; G11B 20/1201; G11B 5/00817
USPC ...................................................... 360/77.12
See application file for complete search history.

(56) References Cited

U.S. PATENT DOCUMENTS

| | | | |
|---|---|---|---|
| 7,002,777 | B2 | 2/2006 | Ogawa et al. |
| 8,587,890 | B2 * | 11/2013 | Bui .................. G11B 5/584 360/48 |
| 8,797,672 | B2 | 8/2014 | Tanabe et al. |
| 9,892,750 | B2 | 2/2018 | Gale et al. |
| 10,014,019 | B2 | 7/2018 | Ahmad et al. |
| 11,404,078 | B1 | 8/2022 | Swanson et al. |
| 11,448,493 | B2 | 9/2022 | Judd et al. |
| 2018/0233169 | A1 | 8/2018 | Biskeborn et al. |

OTHER PUBLICATIONS

I. Tagawa, et al., "Minimization of erase-band in shingled PMR with asymmetric writer," Elsevier B.V., Journal of Magentism and Magnetic Materials, 2012, 3 pp.

* cited by examiner

*Primary Examiner* — Nabil Z Hindi
(74) *Attorney, Agent, or Firm* — KONRAD, RAYNES, DAVDA & VICTOR LLP; William K. Konrad

(57) ABSTRACT

In one aspect of the present disclosure, the degree of side erasure occurring in neighboring tracks is controlled by controlling the skew angle of the tape head, relative to the longitudinal direction of motion of the tape past the head as a track is written. In one embodiment, the tape head is rotated relative to the longitudinal direction of tape travel, and the trailing edge of the tape head which forms an acute angle with the edge of a track being written, is used for writing tracks at a desired track pitch. Other aspects and advantages may be provided, depending upon the particular application.

20 Claims, 12 Drawing Sheets

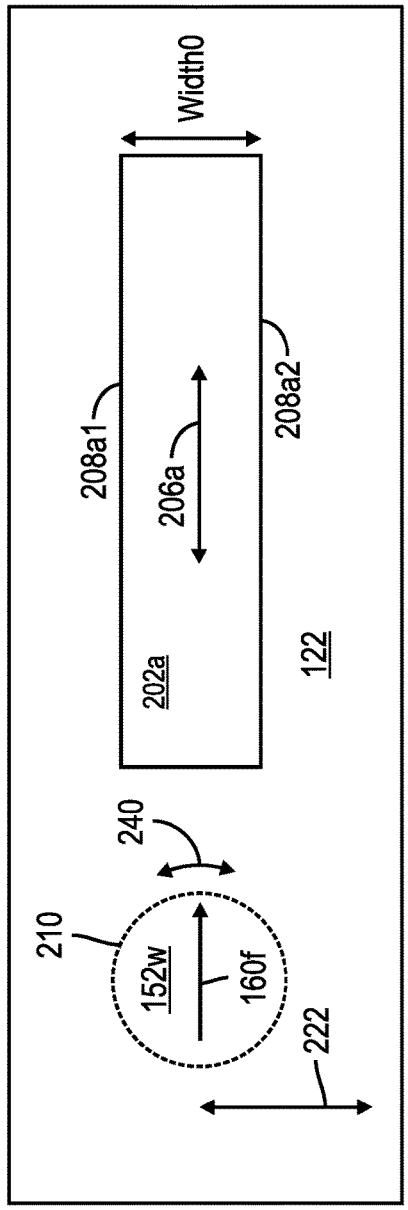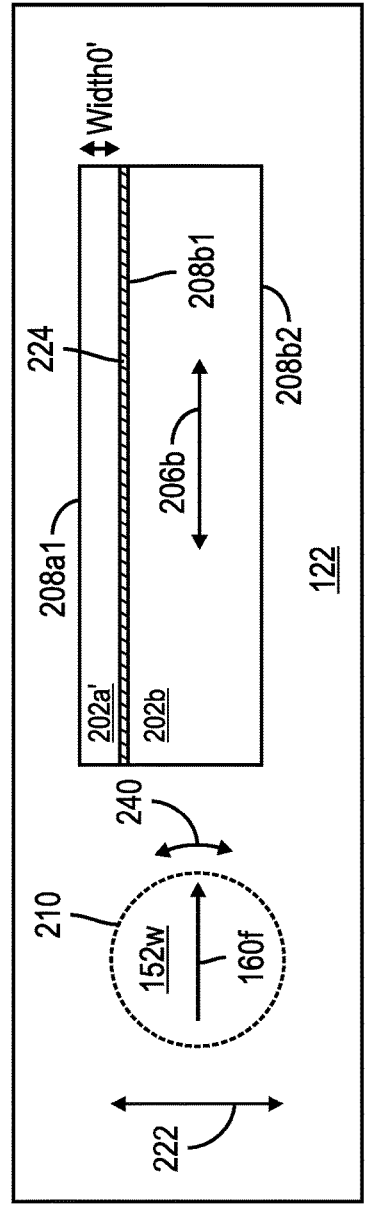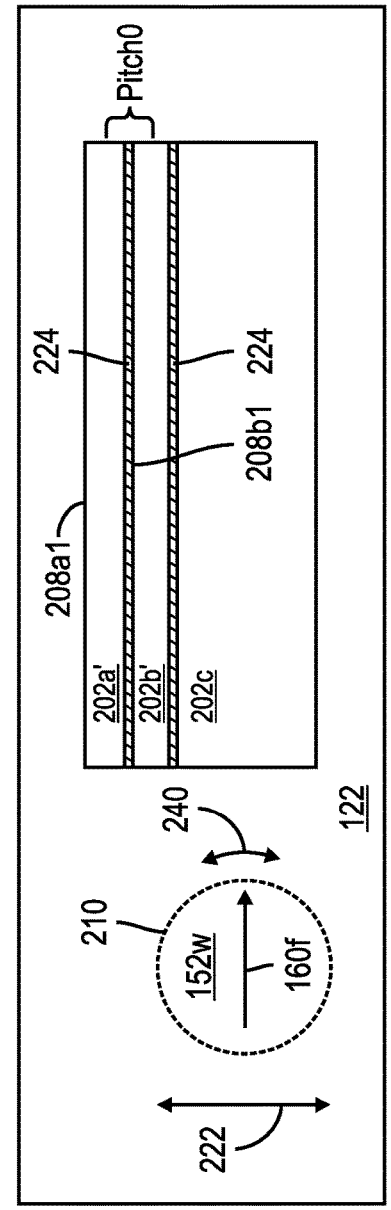

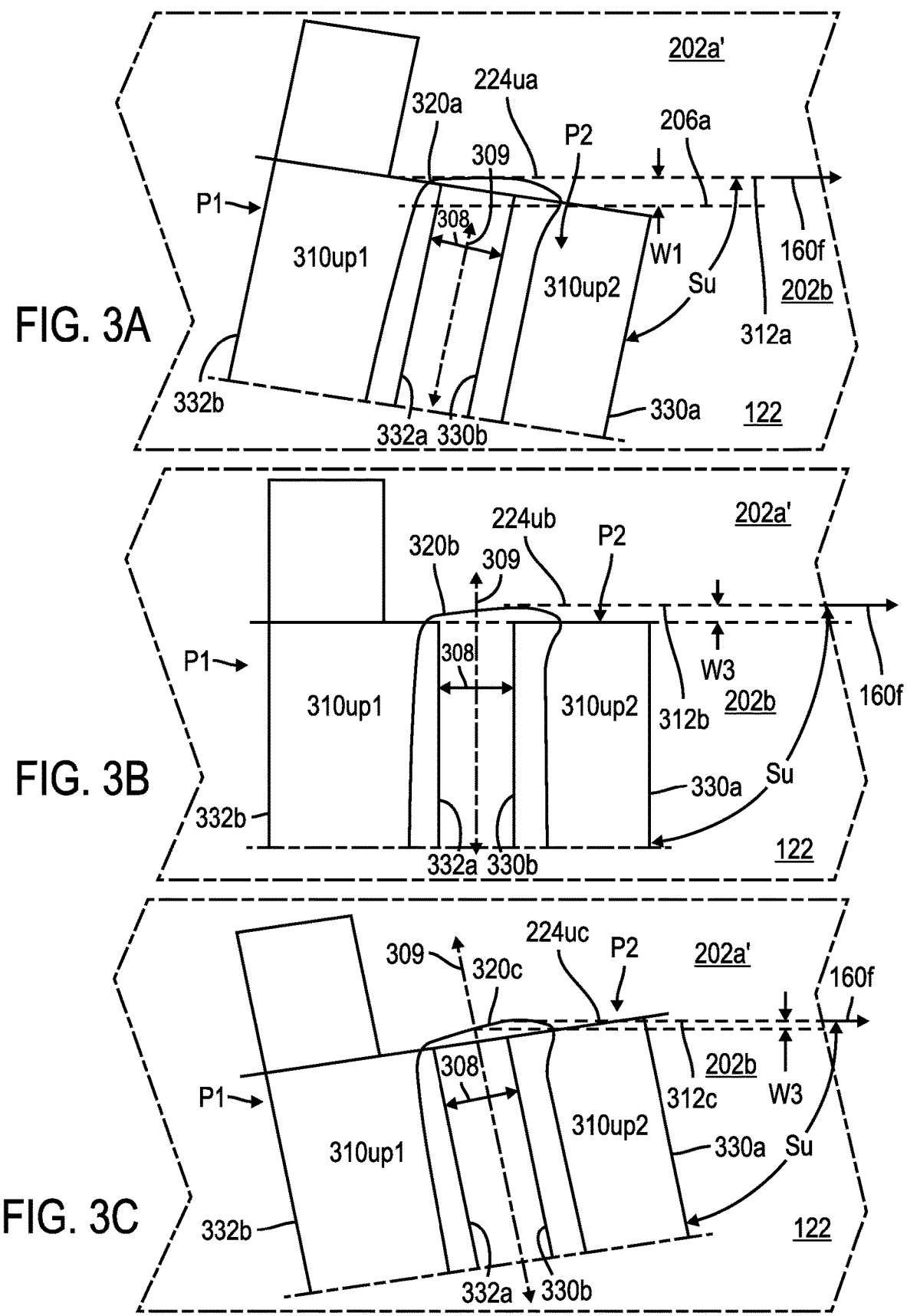

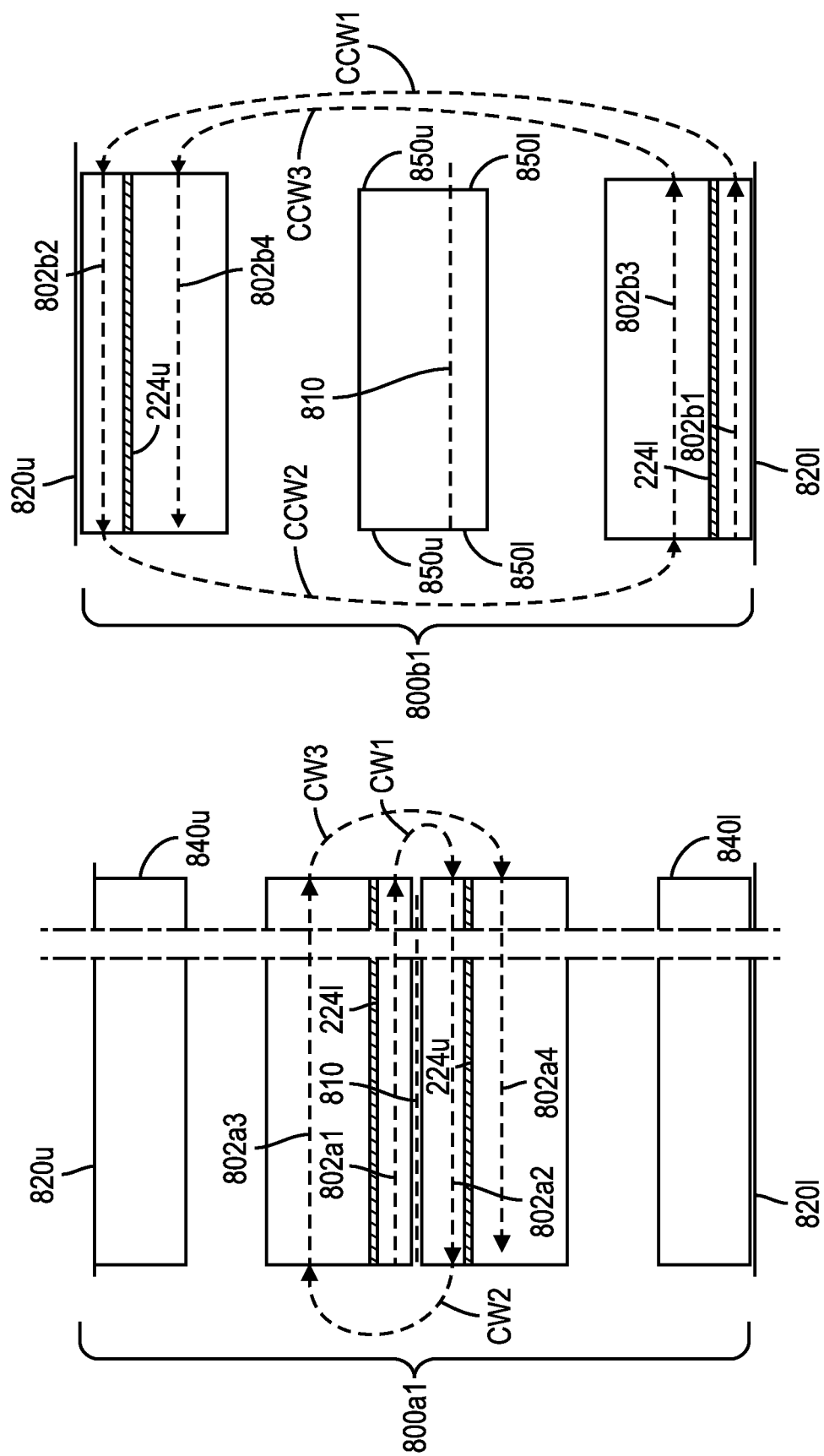

SIDE ERASURE CONTROL FOR TRACK WRITING IN A SYSTEM

BACKGROUND OF THE INVENTION

1. Field of the Invention

The present invention relates to magnetic heads for reading from and writing data to storage media in a storage drive.

2. Description of the Related Art

In magnetic storage systems such as tape drives, data is read from and written onto magnetic recording media through data channels utilizing magnetic transducers in a tape head. As used herein the term "magnetic" refers to the various magnetic technologies including magnetoresistive, electromagnetic and magnetic media/recording layer technologies. Data is written on the magnetic recording media by moving a magnetic recording transducer to a position over the media where the data is to be stored. The magnetic recording transducer then generates a magnetic field in a write bubble, which encodes the data into the magnetic media as the magnetic media is moved past the transducer. Data is read from the media by similarly positioning a magnetic read transducer and then sensing the magnetic field of the magnetic media as it moves past the read transducer. Read and write operations may be independently synchronized with the movement of the media to ensure that the data can be read from and written to the desired location on the media.

Known magnetic tape drives often use ring type write transducers in combination with a process known as shingling to write data in a bi-directional, serpentine fashion on magnetic tape. Multiple tracks are written in parallel by a set of writer transducers into a set of data sub-bands. The data sub-bands have a width approximately equal to the pitch between the writer transducers.

A group of tracks written in parallel down the length of tape is referred to as a wrap. In one known tape drive, the first set of tracks in the first wrap are written in the forward tape direction at the top of each data sub-band of a group of data sub-bands. At the end of tape, the position of the head is shifted down and tracks of the first wrap are written at the bottom of the data sub-bands. At the end of this first reverse wrap the head is shifted back up and a second set of tracks is written in the forward tape direction below the first set of tracks in the forward tape direction. In this manner, tracks are written within each data sub-band in a serpentine, clockwise pattern, starting at the top of the sub-band and continuing writing wraps as the sub-band fills from outside to inside of the sub-band. This serpentine, clockwise, outside to inside recording pattern continues until each sub-band of the set of data sub-bands has been filled with data tracks.

Shingled writing uses a writer that writes tracks that are wider than the desired target track width to enable features such as backwards write compatibility and/or read while write verification. In shingled writing, the pitch between adjacent tracks is less than the width of the writer such that a newly written track partially overwrites the previously written neighboring track, leaving a residual neighboring track with the final desired target track pitch. This overlapping of adjacent tracks is similar to the overlapping of shingles on a roof, hence the name.

Side erasing or erasure, is a known phenomenon caused by fringing fields that spill out beyond the edge of the write gap of a ring writer beyond the trailing edge of the write bubble that defines the written track. This fringing field partially overwrites the adjacent track, effectively erasing a region between the two tracks and results in a residual shingled track that is narrower than the shingled track pitch. This effect has been partially mitigated by notching the leading-edge pole to make the write gap more symmetric and reduce the lateral extent of the fringing fields. However, there is often still a residual effect that results in an erase band on the order of a few hundred nanometers. Such a large erase band can make it very challenging to operate a tape drive with a track pitch not much larger than the erase band between adjacent tracks.

Tape tension has been used for active tape dimensional stability (TDS) compensation. However, this approach is limited in range and can introduce additional problems such as, for example, longer cycle times due to low tension unload, tape cinch, increased risk of tape breakage, variable tape head friction, variable tape head spacing, etc.

SUMMARY

A first embodiment provides a computer program product, system, device and method for side erasure control in writing data tracks on magnetic media. In one embodiment, operations comprise using a writer transducer of a tape head, to write a first linear track of data on the magnetic tape moving in a first linear direction, and using a writer transducer of the tape head, to write a second linear track of data adjacent to the first linear track on the magnetic tape moving in the first linear direction of tape motion and forming a first erase band as the second linear track of data is being written. In one aspect of side erasure control in accordance with the present description, the tape head is rotated at a non-zero angle relative to the first linear direction of tape motion as the second linear track of data is being written, and a trailing edge of the writer transducer of the tape head writing the second linear track of data forms an acute angle with respect to a longitudinal edge of the second linear track as the second linear track is being written.

In another aspect, writing the second linear track of data adjacent to the first linear track includes writing the second linear track of data so that the second linear track of data is partially overlapping the previously written first track of data to shingle the second linear track of data on the previously written first track of data, leaving a first residual track of the previously written first track of data and forming the first erase band between the first residual track and the second linear track of data. In this embodiment, a trailing edge of the writer transducer of the tape head writing the second linear track of data forms an acute angle with respect to a longitudinal edge of the first residual track as the previously written first track of data is partially overwritten.

In another embodiment, writing the second linear track of data adjacent to the first linear track includes rotating the tape head relative to the first linear direction of tape motion at an angle within a range of 5 to 15 degrees and limiting the acute angle of the trailing edge of the writer transducer of the tape head with respect to the longitudinal edge of the second linear track, to be within a range of 85 to 75 degrees, respectively.

In yet another aspect of side erasure control in accordance with the present description, the operations further comprise using a writer transducer of the tape head, to write a third linear track of data on the magnetic tape moving in a second linear direction opposite to that of the first linear direction, and using a writer transducer of the tape head, to write a fourth linear track of data on the magnetic tape moving in the second linear direction, adjacent to the third linear track on the magnetic tape moving in the second linear direction of tape motion and forming a second erase band as the fourth linear track of data is being written. In one embodiment, the tape head is rotated at a non-zero angle relative to the second linear direction of tape motion, and a trailing edge of the writer transducer of the tape head writing the fourth linear track of data forms an acute angle with respect to a longitudinal edge of the fourth linear track as the fourth linear track is being written.

In another aspect, the writer transducer includes a first pole and a second pole which define a gap between the first pole and the second pole, wherein the writer transducer has a trailing edge which is one of 1) a trailing edge of the first pole, and 2) a trailing edge of the second pole, as the second linear track of data is being written.

In another embodiment, the tape head is rotated in a clockwise direction at a non-zero angle relative to the first linear direction of tape motion, and the operations further comprise filling a data sub-band with tracks written in one of 1) a clockwise, inside to outside bi-directional serpentine pattern and 2) a counter-clockwise, outside to inside bi-directional serpentine pattern.

In yet another embodiment, the tape head is rotated in a counter-clockwise direction at a non-zero angle relative to the first linear direction of tape motion, and the operations further comprising filling a data sub-band with tracks written in one of 1) a clockwise, outside to inside bi-directional serpentine pattern, and 2) a counter-clockwise, inside to outside bi-directional serpentine pattern.

Other aspects and advantages may be provided, depending upon the particular application.

BRIEF DESCRIPTION OF THE DRAWINGS

FIGS. 2A-2C illustrate an example of shingled track writing for which side erasure control in accordance with one embodiment of the present description, is employed.

FIGS. 3A-3C illustrate examples of side erasure control as a function of skew angle of a writer of a tape head relative to a shingled track being written by the writer, in accordance with one embodiment of the present disclosure.

FIG. 8A depicts an example of a clockwise, inside to outside serpentine pattern for a data sub-band employing side erasure control in shingled track writing in accordance with one embodiment of the present disclosure.

FIG. 8B depicts an example of a counter-clockwise, outside to inside serpentine pattern for a data sub-band employing side erasure control in shingled track writing in accordance with one embodiment of the present disclosure.

DETAILED DESCRIPTION

Figure 1:
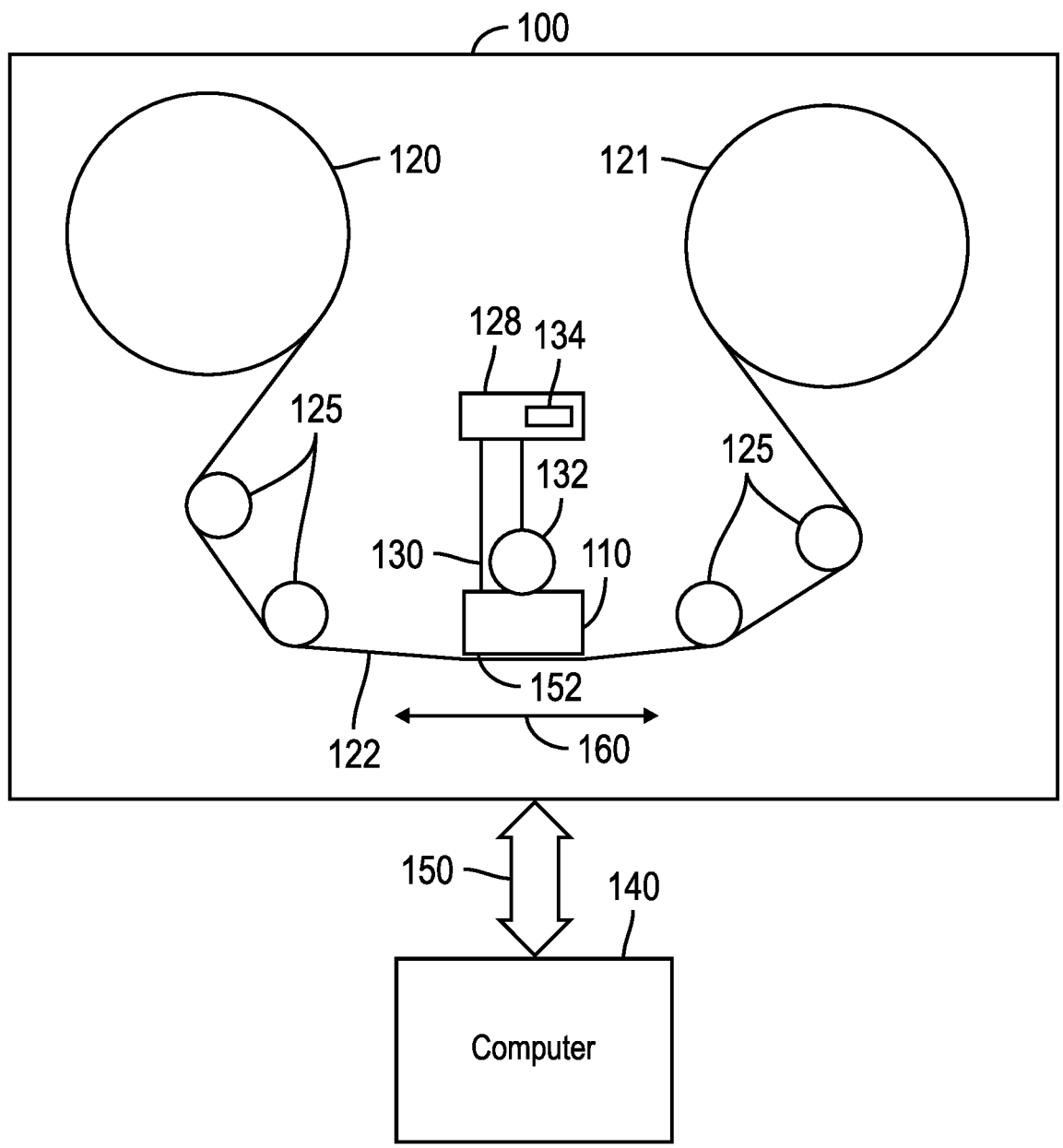
FIG. 1 is a schematic diagram of a storage system employing side erasure control in shingled track writing in accordance with one embodiment of the present disclosure.

Described embodiments provide improvements to computer technology for storing and retrieving data in storage systems such as tape drives, for example, having a tape head which reads data from or writes data to a magnetic tape media. Shingled track writing in accordance with the present description, can control the degree of side erasure occurring in neighboring shingled tracks and as a result, can control the width of erase bands occurring between neighboring shingled tracks. By reducing the width of erase band between neighboring shingled tracks, the width of the shingled tracks may be increased for a given track pitch, thereby increasing reliability of the written data. Alternatively, by reducing the width of erase band between neighboring shingled tracks, the track pitch may be reduced while maintaining a minimum track width and reliability of the written data.

In one aspect of the present disclosure, the degree of side erasure occurring in neighboring shingled tracks is controlled by controlling the skew angle of the tape head, relative to the longitudinal direction of motion of the tape past the head as a track is written. In one embodiment, the tape head is rotated relative to the longitudinal direction of tape travel, and the trailing edge of the tape head which forms an acute angle with the edge of a track being written, is used for shingling tracks at a desired track pitch.

It is appreciated that the longitudinal direction of edges of the tracks being written and partially overwritten in shingling is defined by the longitudinal direction of the tape moving past the stationary head. Accordingly, in one embodiment, the degree of side erasure occurring in neighboring shingled tracks is controlled by controlling the skew angle of the tape head and hence, the skew angle of each writer of the head, relative to the longitudinal direction of the edges of the tracks being written and partially overwritten so that the edges of the tape head (or the writers of the tape head) form an acute angle with the longitudinal direction of the edges of the tracks being written and partially overwritten.

In one embodiment, active skew control or compensation may be for active tape dimensional stability (TDS) control to enable higher track density and hence increased capacity. In active skew compensation, the tape drive is operated with a head that has a nominal, non-zero rotation angle (R) relative to the longitudinal direction of tape travel. As used herein, a rotation angle that is in a clockwise direction relative to the longitudinal direction of tape travel is expressed as a positive value, such as a clockwise rotation angle R=+10 degrees, for example, as viewed from the tape bearing surface of the head. Conversely, a rotation angle that is in a counter-clockwise direction relative to the longitudinal direction of tape travel is expressed as a negative value, such as a counter-clockwise rotation angle R=−10 degrees, for example, as viewed from the tape bearing surface of the head. Thus, a tape head rotated at an angle of R=−10 degrees is rotated at an angle of 10 degrees, but in a counter-clockwise direction relative to the longitudinal direction of tape travel. The effective span of the head can be increased or decreased by decreasing or increasing the absolute value of the rotation angle, respectively, to facilitate active TDS control.

In one aspect of side erasure control for shingled track writing in accordance with the present description, if the tape head is rotated relative to the direction of tape travel, for purposes of providing active skew compensation, a writer writing a track is positioned so that each previously written track being partially overwritten by a subsequent track, is positioned at the lateral end of the writer which has a trailing edge that forms an acute angle with a longitudinal edge of the previously written track being partially overwritten. In one embodiment, the tape head is positioned so that the residual track remaining after being partially overwritten by the track being currently written, is positioned at the end of the writer which ensures that the trailing edge of the writer at that end forms an acute angle with an edge of the residual track remaining as the previously written track is being overwritten.

As explained in greater detail below, by positioning the tape head relative to the residual track being formed so that the trailing edge of the writer adjacent or proximal to the residual track forms an acute angle with the edge of the residual track being formed, the degree of side erasure occurring in the neighboring track can be reduced to reduce the width of erase bands occurring between neighboring shingled tracks. It is appreciated that a reduction in the extent of side erasure and hence a reduction in the width of erase bands occurring between neighboring shingled tracks, can have a corresponding increase in usable track width at a given track pitch of shingled tracks. In one embodiment of side erasure control in accordance with the present description, it is believed that an increase in useable track width of 33%, for example, may be achieved by positioning the writer of a tape head relative to the residual track being formed by that writer, so that the trailing edge of the writer adjacent to the residual track forms an acute angle with the edge of the residual track being formed. Furthermore, such an increase in useable track width can provide for a substantial increase in signal to noise (SNR) ratio. For example, it is believed that a 33% increase in useable track width can provide an increase in SNR of +0.5 dB, in some embodiments.

In another aspect of side erasure control in accordance with the present description, it is believed that rotation of a tape head at an angle relative to the tape direction of travel for purposes of implementing skew-based TDS compensation, creates an asymmetry in the size of fringing fields extending into a neighboring track. In one embodiment, this asymmetry in fringing fields depends upon whether the fringing fields are generated by either the upper or lower portions of write transducers of a tape head angled relative to the direction of tape travel.

For example, if a write transducer is writing shingled tracks in the forward tape direction starting at the top of a data sub-band and progressively writing each subsequent overlapping forward tape direction track below the previously written forward tape direction track, and the write transducer is rotated in the clockwise direction relative to the forward tape direction of tape, the trailing edge of the upper lateral end of the write transducer adjacent the previously written forward tape direction track forms an obtuse angle (>90 degrees) to the edge of the previous track written in the forward tape direction. By comparison, if the write transducer rotated in the clockwise direction relative to the forward tape direction of tape, is writing shingled tracks in the forward tape direction but starting at the bottom of a data sub-band and progressively writing each subsequent overlapping forward tape direction track above the previously written forward tape direction track, the trailing edge of the lower lateral end of the write transducer adjacent the previously written track forms an acute angle (<90 degrees) to the edge of the previous forward written track.

In one aspect of side erasure control in accordance with the present description, it is recognized that this asymmetry depending upon whether the fringing fields are generated by either the top or bottom portions of write transducers of a tape head angled relative to the edge of the neighboring track written by the head, results in less overlap of the fringing fields that cause side erasing in the adjacent track for the writer edge portion if the writer portion adjacent the residual track being formed has a trailing edge that forms an acute angle with the residual track being formed. As a result, the width of the resultant erase band is reduced. By comparison, this asymmetry results in an increase in the fringing fields and hence an increase in the width of the resultant erase band, for the writer trailing edge portion that forms an obtuse angle with the residual track being formed.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. Moreover, the figures are schematic figures in which components are represented by shapes simplified for purposes of clarity. In such schematic diagrams, the relative proportional sizes of the various depicted components are not intended to reflect any particular proportional relationships. For example, components such as write transducers typically measured in microns may be depicted disproportionally large with respect to other much larger components such as tape media or tape heads, typically measured in millimeters, for example, for clarity in presentation.

FIG. 1 is a schematic diagram illustrating a storage system which includes a tape drive 100 having a tape head 110 for recording shingled data tracks on magnetic tape media. As described in greater detail below, the tape drive 100 employs side erasure control in accordance with the present description, to reduce the width of erase bands between adjacent shingled data tracks.

While one specific implementation of a tape drive is shown in FIG. 1, it should be noted that the embodiments described herein may be implemented in the context of any type of tape drive system employing magnetic tape media. In some embodiments, the tape drive 100 may represent a half-height tape drive and in other embodiments, the tape drive 100 may represent a full-height tape drive. Furthermore, it is appreciated that embodiments described herein may be implemented in other types of storage devices having write or read heads for storing or retrieval of data on other types of magnetic media, such as disk drives having sliders, for example. Still further, it is appreciated that side erasure control in accordance with the present description may also be employed in other types of magnetic systems such as tape servo formatting systems, for example.

As shown, a tape supply cartridge 120 and a take-up reel 121 are provided to support a magnetic tape 122 referred to herein as magnetic tape, or simply tape 122. One or more of the reels may form part of a removable cartridge and are not necessarily part of the system 100. The tape drive, such as that illustrated in FIG. 1, may further include drive motor(s) to drive the tape supply cartridge 120 and the take-up reel 121 to move the tape 122 over the tape head 110. The head 110 includes one or more arrays of transducers such as reader, writer, or servo transducers.

Guides 125 guide the tape 122 across the tape head 110. Such tape head 110 is in turn coupled to a controller 128 via a cable 130. The controller 128 having a memory 134 typically controls head functions such as servo following, writing, reading, etc. The controller may operate under logic known in the art or which may be subsequently developed, modified as appropriate for the tape head 110 of the present description, as well as any logic disclosed herein. The cable 130 may include read/write circuits or channels to transmit data to the head 110 to be recorded on the tape 122 and to receive data read by the head 110 from the tape 122. An actuator 132 is configured to control position of the head 110 relative to the tape 122. An interface of the controller 128 may also be provided for communication between the tape drive and a host (integral or external) or other computer 140 of the storage system to send and receive the data and for controlling the operation of the tape drive and communicating the status of the tape drive to the host, all as will be understood by those of skill in the art.

The storage system represented by the tape drive 100 may include an automated tape library for example, having one or more tape drives 100 docked in the library system. An example of such a tape library is an LTO tape library such as the TS4500 marketed by IBM, which has been modified to include tape drives having side erasure control in accordance with the present description.

The computer 140 represents one or more of host computers, user computers, workstations, storage controllers, or other computers coupled to each other and to the tape drive 100 by one or more networks 150. In one embodiment, a host computer 140 coupled to the tape drive 100 receives requests over a network from user computers to access data in tape cartridges 120 internal to the tape library using tape drives 100 of the tape library.

The computer 140 may be an enterprise computer system in which aspects of a storage system in accordance with the present description may be realized. Examples of enterprise-wide applications include, without limitation, banking transactions, payroll, warehouse, transportation, and batch jobs.

The magnetic tape 122 (FIG. 1) passes over the tape or media facing surfaces 152 of the head 110 in linear, longitudinal forward and reverse (or backward) directions which are generally parallel to the directions represented by an arrow 160. The longitudinal motion of the tape 122 is provided by linear actuators which includes reels 120, 121 (FIG. 1). The linear actuators are configured to move the magnetic tape 122 in the linear, longitudinal directions represented by the arrow 160 past the media facing surfaces 152 of the tape head 110. In this embodiment, the arrow 160 represents the linear, longitudinal directions of motion of the tape caused when being wound and unwound from the reels 120, 121 of the tape drive 100.

As the tape 122 and the head 110 move relative to each other, the tape 122 may be supported by the media facing surfaces 152 of the head 110. Hence, the media facing surfaces are sometimes referred to as media bearing surfaces. The tape 122 and the media facing surfaces 152 of the head 110 are typically in direct contact with each other at least in the region of the tape head where the read and write transducers are located. The head 110 has transducers which provide one or more media facing surfaces 152 of the head 110, and are adapted to at least one of read data from and write data to the magnetic tape 122 moving past the tape head transducers of the head 110. A transducer configured to write data on the tape 122 is referred to herein as a writer transducer or simply a "writer."

FIGS. 2A, 2B shows in schematic form, a simplified example of two linear, longitudinal data tracks 202a, 202b written on the tape 122 (FIG. 1) by a writer 210 of the tape bearing surface of the head 110 (FIG. 1) in two different lateral positions of the head 110 and hence the writer 210 relative to the tape 122. In this example, the track 202 is written on the tape 122 first as shown in FIG. 2A. The track 202a is written as the tape 122 is moved past the writer 210 of the head 110 in a forward tape direction which is left to right as viewed in the example of FIG. 2A. As used herein, the term "data" written on a magnetic tape includes data such as user data which may be written by a tape drive, for example, and servo data which may be written by a tape servo formatting system, for example.

In the example of FIGS. 2A-2C, the writer 210 is positioned behind the tape 122 and therefore is depicted schematically in phantom. The writer 210 has one or more media facing surfaces 152w facing the tape 122 as the tape 122 moves past the writer 210.

The forward tape direction of the tape 122 relative to the head 110, is represented by a vector 160f superimposed over the media facing surfaces 152w of the writer 210. The media facing surfaces 152w of the writer 210 are generally planar but is appreciated that such generally planar media facing surfaces may be slightly curved in whole or in part to reduce the potential for tape damage as the tape moves past the writer 210.

The forward tape direction vector 160f is generally parallel to the linear, longitudinal direction of movement of the tape 122 as represented by the arrow 160 of FIG. 1. As a result, the track 202a as it is written, defines a linear, longitudinal axis 206a parallel to the linear, longitudinal forward motion of the tape 122 as represented by the vector 160f. The track 202a has longitudinal top and bottom edges 208a1, 208a2 which are generally parallel to the longitudinal axis 206a of the track 202a, and the forward tape direction vector 160f of movement of the tape 122.

In this example, the "forward" tape direction represented by the vector 160f represents the linear, longitudinal direction of motion of the tape 122 past the writer 210 caused when the tape is being unwound from the supply reel of the cartridge 120 (FIG. 1) and is being wound onto the take up reel 121 of the tape drive 100. Conversely, the "reverse" tape direction represented by the vector 160r (FIG. 4) represents the linear, longitudinal motion of the tape caused when the tape is being wound onto the supply reel of the cartridge 120 (FIG. 1) and is being unwound from the take up reel 121 of the tape drive 100. It is appreciated that forward and reverse tape directions of the tape 122 may be defined in an opposite manner or using other tape actuation components, depending upon the particular application.

After completing the writing of the first track 202a in the forward tape direction, and then completing the writing of a track (not shown) in the reverse tape direction of tape motion at a different lateral head position, the head 110 and the writer 210 carried on the head 110 (FIG. 1) is again moved laterally relative to the tape 122 to the lateral position depicted in FIG. 2B to write the next forward tape motion track 202b as shown in FIG. 2B. Tape drive lateral actuators 132 (FIG. 1) are configured to cause lateral motion of the head 110 in a direction represented by an arrow 222 which is generally parallel to the lateral head motion. The direction of lateral motion as represented by the arrow 222 is generally transverse to, or in this embodiment, orthogonal to that of the linear, longitudinal forward tape direction 160f of the tape 122 relative to the head 110. As viewed in FIGS. 2A, 2B, the direction of lateral motion represented by the arrow 222 may be referred to as an "up" or "down" motion, relative to the linear, longitudinal directions 160 (FIG. 1), 160f of movement of the tape 122 past the writer 210.

At the subsequent lateral position of the writer 210 depicted in FIG. 2B, the track 202b is written on the tape 112 (FIG. 1) as the tape is again moved forward past the stationary writer 210 of the head 110 in the forward tape direction parallel to the vector 160f. As a result, the track 202b as it is written, defines a longitudinal axis 206b parallel to the linear, longitudinal forward motion of the tape 122 past the writer 210 as represented by the vector 160f. The longitudinal top and bottom edges 208b1, 208b2 of the track 202b are generally parallel to the longitudinal axis 206b of the track 202b and the forward tape direction 160f of the tape 122 past the head 110.

In the example of FIGS. 2A-2B, the writer 210 writes the tracks so that each track 202a, 202b when initially written has an initial width (indicated as Width0 in FIG. 2A) which is wider the desired target track pitch, to enable features such as read while write verification or backwards write compatibility, or both. However, the tracks 202a, 202b are written in a "shingled" format in reduce the effective width of each shingled track and hence reduce the pitch of the shingled tracks. Thus, in the example of FIG. 2B, the newly written forward motion track 202b is written below but partially overwrites the previously written neighboring forward motion track 202a (FIG. 2A), leaving a residual neighboring track 202a' having a substantially smaller width (indicated as Width0' in FIG. 2B). This overlapping by track 202b over the previously written adjacent track 202a (FIG. 2A) leaving a residual track 202a' (FIG. 2B), is similar to the spatial overlapping of shingles on a roof, hence the tracks 202a', 202b (FIG. 2B) are referred to herein as being shingled tracks. As explained in greater detail below, side erasing occurring in the previously written track 202a as the neighboring and overlapping track 202b is being written, combined with the forward motion of the tape, is believed to create an erase band 224 between the shingled tracks 202a', 202b.

To write another forward motion track 202c (FIG. 2C) after completing the writing of the track 20b and then completing the writing of a reverse motion track (not shown) at a different lateral head position, the writer 210 on the head 110 is again subsequently moved laterally relative to the tape 122 in the direction of arrow 222 to the lateral position of FIG. 2C, to write forward motion track 202c as shown in FIG. 2C. At this subsequent lateral position of the writer 210, the track 202c is written on the tape 112 as the tape is again moved past the writer 210 in the forward tape direction represented by the vector 160f. In the example of FIG. 2C, the newly written forward tape motion track 202c is written below and partially overwrites the previously written neighboring forward tape motion track 202b (FIG. 2B), leaving a residual neighboring track 202b' with the final target track pitch Pitch0 FIG. 2C) between residuals tracks 202a', 202b' as shown in FIG. 2C. Here too, side erasing occurring in the previously written track 202b as the neighboring and overlapping track 202c is being written, combined with the forward motion of the tape, creates another erase band 224 between the shingled tracks 202b', 202c.

As described in greater detail below, the tape drive 100 employs side erasure control in accordance with the present description, to reduce the width of erase bands 224 between shingled data tracks such as the shingled data tracks 202a', 202b', 202c (FIG. 2C). It is appreciated herein that as tape drives are designed to write data tracks having increasingly small track pitches, the phenomenon of side erasing which causes erase bands to occur between shingled tracks, provides significant challenges to achieving such increasingly small track pitches in shingled data tracks. As explained below, shingled track writing in accordance with the present description, can control the degree of side erasure occurring in neighboring shingled tracks and hence can control the width of erase bands occurring between neighboring shingled tracks. In one embodiment, the degree of side erasure occurring in neighboring shingled tracks is controlled by controlling the skew angle of each writer such as the writer 210 carried on the head 110, relative to the longitudinal direction of motion of the tape, or more specifically in this embodiment, relative to a longitudinal edge of the residual track remaining as the previously written track is overwritten by the writer. It is appreciated that the orientation of the longitudinal edge of the residual track remaining as the previously written track is overwritten by the writer, is defined by the longitudinal direction of motion of the tape.

Control of the tape head writer skew angle in accordance with the present description, is represented in FIGS. 2A-2C by an arc 240 centered on the writer 210. In one embodiment, the width of erase bands may be reduced by side erasure control in accordance with the present description, to achieve a desired small track pitch notwithstanding the presence of erase bands between neighboring tracks.

As is known, side erasing is caused by fringing fields that spill out beyond the edge of the write gap of a ring writer beyond the trailing edge of the write bubble that defines the track being written. The fringing fields partially overwrite the previously written adjacent track, effectively erasing a region between adjacent shingled tracks. The erased region referred to herein as an erase band, results in a residual shingled track 202b' that is narrower in width than the shingled track pitch represented as Pitch0 (FIG. 3C) between adjacent residual tracks 202a' and 202b'. Moreover, if the erase band 224 between adjacent residual tracks 202a' and 202b' is too large relative to the shingled track pitch represented as Pitch0 (FIG. 2C), the erase band can effectively degrade or destroy the residual tracks.

However, FIGS. 3A-3C depict in schematic form, three examples directed to formation of the shingled tracks 202a', 202b (FIG. 2B) in which the degree of such spilling out of the fringing fields and the size of the resultant erase band may be controlled as the newly written track 202b of FIG.

2B partially overwrites the previously written neighboring track 202a (FIG. 2A). More specifically by controlling the skew angle of the writer 210 carried on the head 110, relative to the longitudinal direction of tape motion, as represented by a longitudinal edge of the residual track formed as the previously written track is being partially overwritten in a set of shingled tracks, the degree of spilling out of the fringing fields and the size of the resultant erase bands between the tracks may be controlled. In one embodiment, the longitudinal direction of tape motion defines the longitudinal orientation of each erase band 224 and thus the longitudinal edge of the residual track of the previously written track being overwritten. Thus, the skew angle of a writer carried on the tape head may, in one embodiment, be measured relative to the longitudinal edge of an erase band 224 which provides the edge of the residual track.

In the examples of FIGS. 3A-3C, the writer 210 is a ring type writer transducer which includes two poles made of ferro-magnetic material, and referred to herein as P1 and P2. The poles P1, P2 are separated at one end to form a gap 308 adjacent the moving tape. The gap 308 between the poles P1, P2 defines an axis 309 parallel to the edges of the gap 308. In the schematic diagrams of FIGS. 3A-3C, the upper portions of the two poles P1, P2, of the writer 210, are indicated at 310up1, 310up2, and are depicted in schematic form. As used herein, the term "upper" is a spatial direction defined as a function of the forward direction of tape movement.

Figure 4:
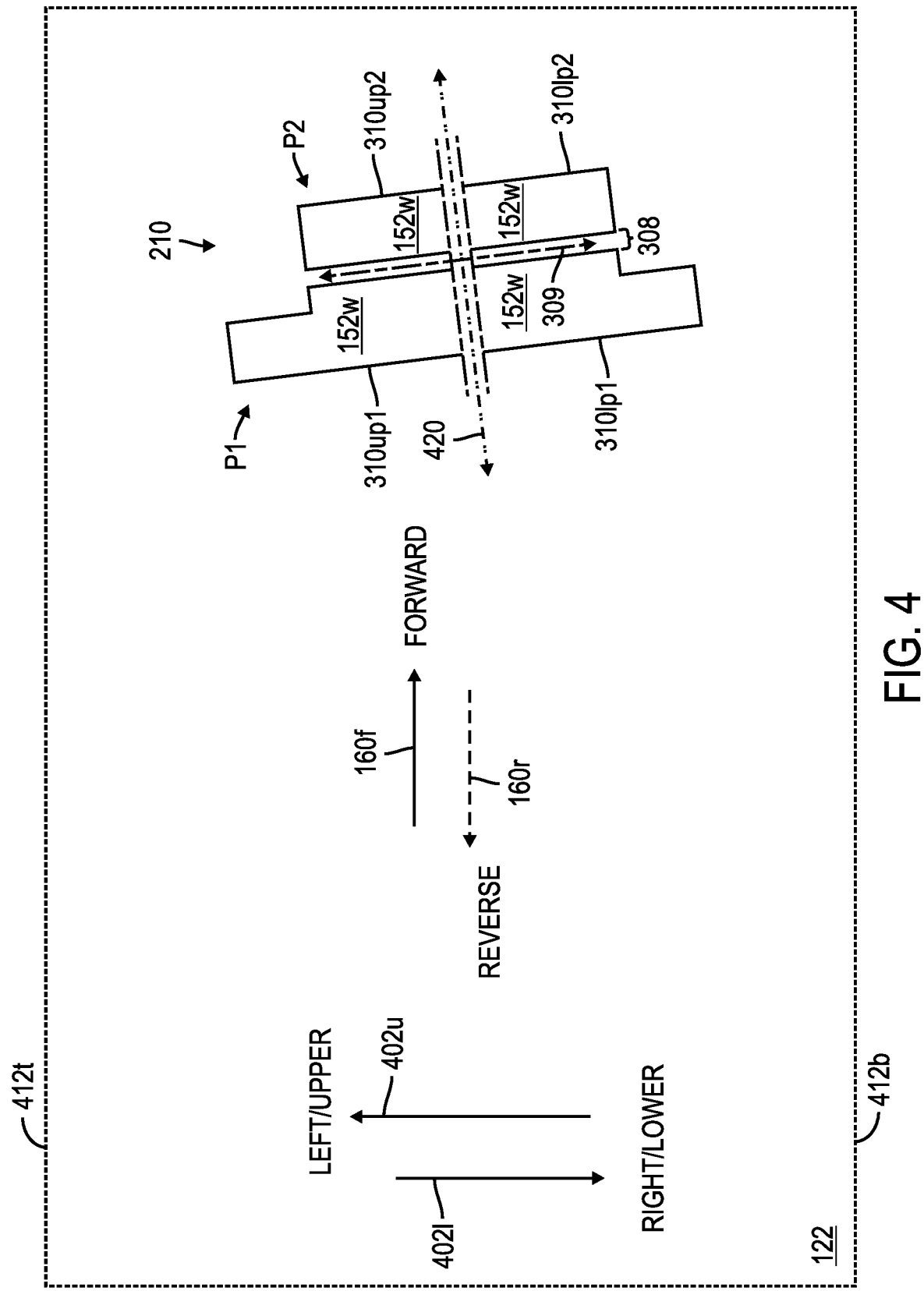
FIG. 4 is a diagram illustrating an embodiment of spatial directions relative to longitudinal tape motion and lateral tape head motion, for side erasure control in accordance with one embodiment of the present description.

For example, FIG. 4 depicts a schematic representation of the longitudinal tape 122 (depicted in phantom) positioned over tape facing surfaces 152w of the poles P1, P2 of the writer 210. In this example, the "upper" spatial direction is defined with respect to the direction of forward movement of the tape as represented by the vector 160f. More specifically, the "upper" spatial direction is represented by a vector 402u which is transverse to the tape forward tape direction vector 160f and is directed to the left or counter-clockwise direction with respect to the forward tape direction vector 160f. Conversely, the "lower" spatial direction is represented by a vector 402l which is also transverse to the tape forward tape direction vector 160f but is directed to the right or clockwise direction with respect to the forward tape direction vector 160f.

If the tape 122 is moving in the backward or reverse tape direction as represented by the vector 160r, the "upper" and "lower" directions defined herein remain unchanged in these examples. Accordingly, the "upper" spatial direction remains defined by the vector 402u which is transverse to the tape reverse tape direction vector 160r but is directed to the right or clockwise direction with respect to the tape reverse tape direction vector 160r. Similarly, the lower spatial direction remains represented by the vector 402l which is also transverse to the reverse tape direction vector 160r but is directed to the left or counter-clockwise direction with respect to the reverse tape direction vector 160r.

In accordance with this "upper" and "lower" direction convention, the tape 122 has an upper longitudinal edge 412p which is referred to herein as the "top" edge 412t, and a lower longitudinal edge 412b referred to as the "bottom" edge 412b as shown in FIG. 4. In this example, the upper direction vector 402u points toward the tape top edge 412t and the lower direction vector 402l points toward the tape bottom edge 412b.

Similarly, the two poles P1, P2 of the writer 210 have upper portions 310up1, 310up2 at an upper lateral end of the poles P1, P2, respectively. The upper portions 310up1, 310up2 of the upper lateral end are designated as upper in this example because the portions 310up1, 310up2 are located in the upper lateral direction (represented by vector 402u) with respect to a center axis 420 of the poles P1, P2 of the writer 210. The center axis 420 of the poles P1, P2 of the writer 210 is transverse to the gap axis 309 and in the illustrated embodiment, is orthogonal to the gap axis 309.

Also depicted in FIG. 4 are lower portions 310lp1, 310lp2 of the poles P1, P2, respectively, at a lower lateral end of the poles P1, P2. The lower portions 310lp1, 310lp2 of the lower lateral end are designated as lower in this example because the portions 310lp1, 310lp2 are located in the lower lateral direction (represented by vector 402l) with respect to the center axis 420 of the poles P1, P2 of the writer 210.

Thus, in this example, the upper portions 310up1, 310up2 are positioned closer to the tape top edge 412t as compared to the lower portions 310lp1, 310lp2. Conversely, the lower portions 310lp1, 310lp2 are positioned closer to the tape bottom edge 412b as compared to the upper portions 310up1, 310up2 of the poles P1, P2.

In the examples of FIGS. 3A-3C, the erase band being formed between the track 202b and the residual track 202a', is formed at the upper lateral end of the writer 210 by the fringing fields emanating from the upper portions 310up1, 310up2 of the poles P1. P2, respectively, of the writer 210. Hence, in these examples, the erase band being formed in FIGS. 3A-3C is referred to herein as an upper erase band. The upper erase band formed in each of the examples of FIGS. 3A-3C is indicated at erase band 224ua, 224ub, 224uc, respectively. In this embodiment, the skew angle represented as $S_u$ in FIGS. 3A-3C, of a writer 210 carried on the tape head 110, may be measured relative to the longitudinal edge 312a of the residual track 202a' being formed, or the longitudinal edge 208b1 (FIG. 2B) of the track 202b being formed adjacent to the previously written track 202a. Since the edge 312a of the residual track 202a' and the edge 208b1 (FIG. 2B) of the track 202b being formed result from the formation of an upper erase band, the skew angle Su of a writer 210 carried on the tape head 110 may also be measured relative to the longitudinal upper erase band 224ua, 224ub, 224uc as shown in FIGS. 3A-3C, respectively, and is referenced herein as the upper skew angle Su of the writer 210.

An electromagnetic coil (not shown) when energized generates a magnetic field which bridges the gap 308 (FIGS. 3A-3C, 4) between the two poles P1, P2 to form a write bubble which writes data on the moving tape 122. The polarity of the magnetic field bridging the gap 308 may be reversed back and forth as the tape moves past the gap to create transitions in the ferromagnetic material of the tape to encode digital data. When the tape 122 is moving in the forward tape direction represented by the vector 160f (FIG. 4), the pole P1 is the leading pole of the writer 210 and the pole P2 is the trailing pole of the writer 210. Conversely, when the tape 122 is moving in the reverse or backward direction 160r (FIG. 4) which is opposite to that represented by the vector 160f, the pole P2 is the leading pole of the writer 210 and the pole P1 is the trailing pole of the writer 210.

In one aspect of shingled track writing in accordance with the present description, the degree of side erasure occurring in neighboring tracks is controlled by controlling the skew angle of the head 110 (FIG. 1) and hence the skew angle of each writer carried on the head 110, relative to the direction of the tape 122 as represented by the forward vector 160f, for example. In one embodiment, the longitudinal direction of tape motion as represented by the forward vector 160f defines the longitudinal orientation of each forward tape direction residual track and its neighboring forward tape direction erase band such that a longitudinal edge of a forward tape direction residual track or a forward tape direction erase band being formed by the side erasing, is aligned and co-linear with a forward tape motion vector 160f. Thus, the forward tape direction skew angle of the tape head and its writers 210 may, for example, be measured relative to a longitudinal edge of a forward tape direction residual track or its erase band being formed, which are each co-linear with a tape forward motion vector 160f.

In the example of FIG. 3A, the upper skew angle Su of the tape head 110 (FIG. 1) and hence the writer 210 carried on the head 110, is depicted at an obtuse skew angle, that is S>90 degrees, or more particularly, an upper skew angle $S_u$=100 degrees, in this example, relative to the edge 312a of the residual track 202a' of the previously written track 202a which is defined by the forward direction of motion of the tape as represented by the forward vector 160f. Accordingly, in this example, a forward vector 160f is aligned with a longitudinal edge 312a of the residual track 202a' defined by the erase band 224ua being formed in the tape 122 by the side erasing.

In the examples of FIGS. 3A-3C, the trailing edge or face of the writer 210 is an edge or plane 330a of the upper portion 310up2 of the pole P2 which is the trailing pole as the tape 122 moves in the forward tape direction (or left to right in the views of FIG. 3A-3C) as indicated by the forward tape direction vector 160f. In these examples, the trailing edge 330a of the pole P2 is parallel to the axis 309 of the gap 308 of the poles P1, P2. Also, the upper lateral end of the pole P2 is that end of the pole P2 which is closer (or proximal) to the previously written track 202a being overwritten by the track 202b of the shingled tracks 202a', 202b, to form the residual track 202a'. In the examples of FIGS. 3A-3C, the upper skew angle Su is measured as the angle of the trailing edge 330a of the upper lateral end of the writer 210 relative to the edge such as the edge 312a (FIG. 3A) of the residual track 202a' of the previously written track 202a being overwritten by the track 202b of FIGS. 2B, 3A-3C.

In the illustrated embodiment, the trailing edge 332a of the leading pole P1 and the leading edge 330b of the trailing pole P2 form the gap 308 between the poles P1, P2 of the writer 210. The gap 308 defines the gap axis 309 transverse to the tape motion forward tape direction vector 160f, such that the gap 308 and its axis 309 are each generally parallel to the trailing edge 330a of the pole P2. As a result, in this embodiment, the upper skew angle Su may also be measured as the angle formed by the gap axis 309 of the gap 308 relative to the longitudinal edge of the residual track 202a' being formed as the track 202b overwrites the previously written track 202a.

Figure 5B:
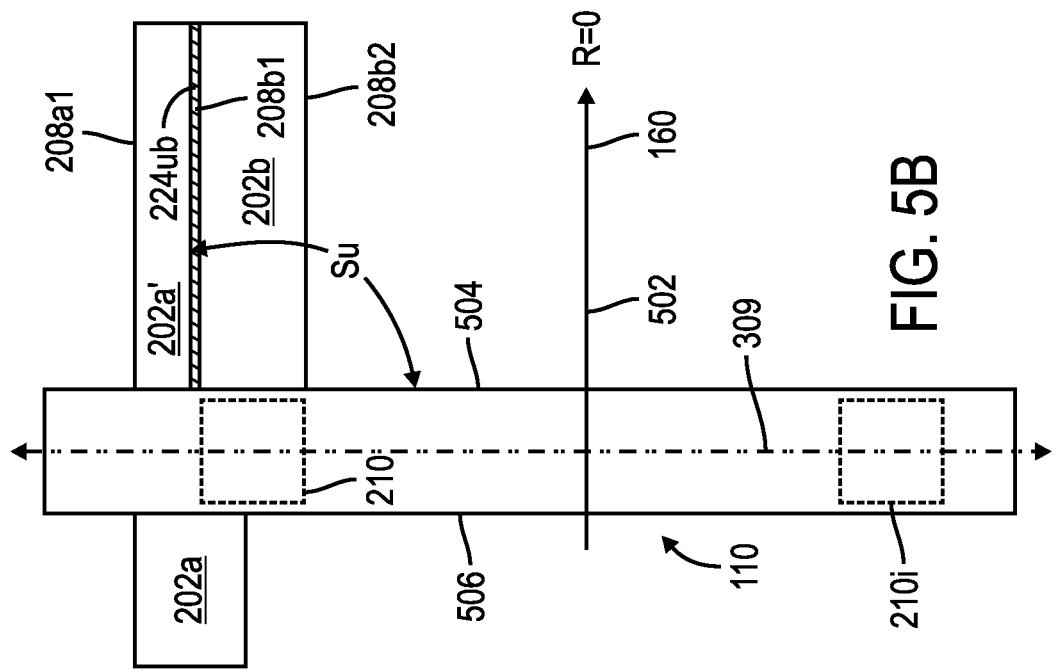
FIGS. 5A-5C illustrate examples of side erasure control as a function of skew angle between a tape head and shingled tracks being written by the tape head, in accordance with one embodiment of the present disclosure.
Figure 5A:
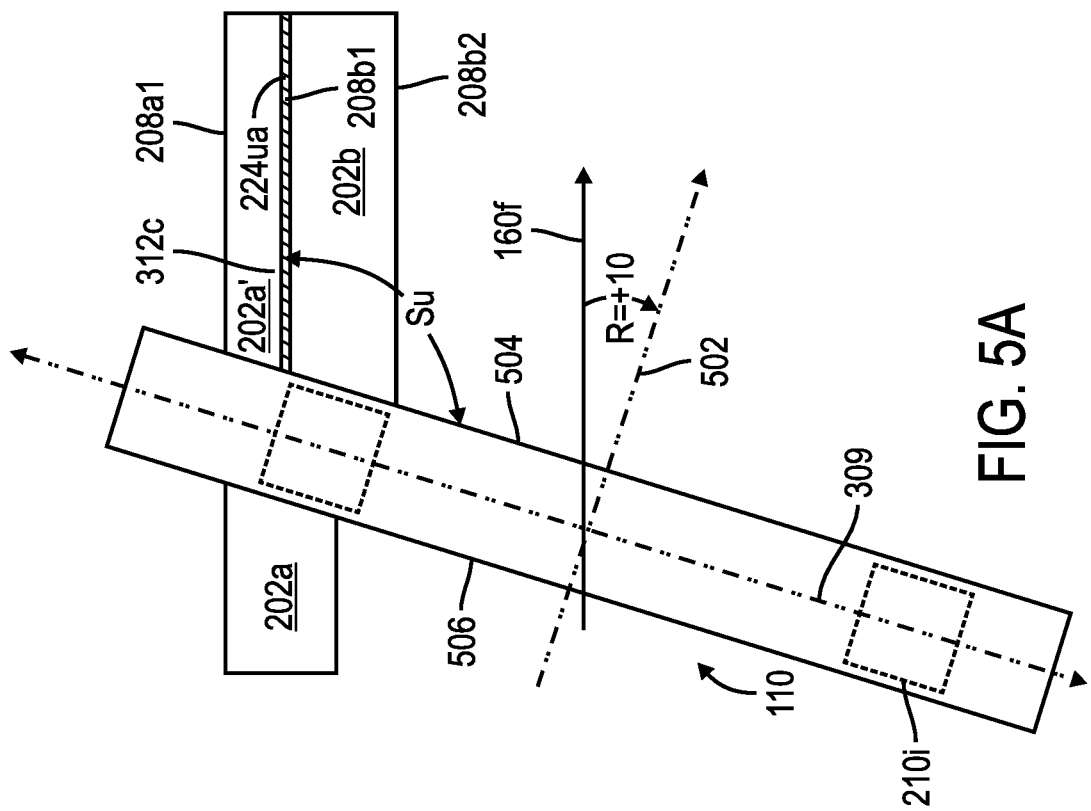
Figure 5C:
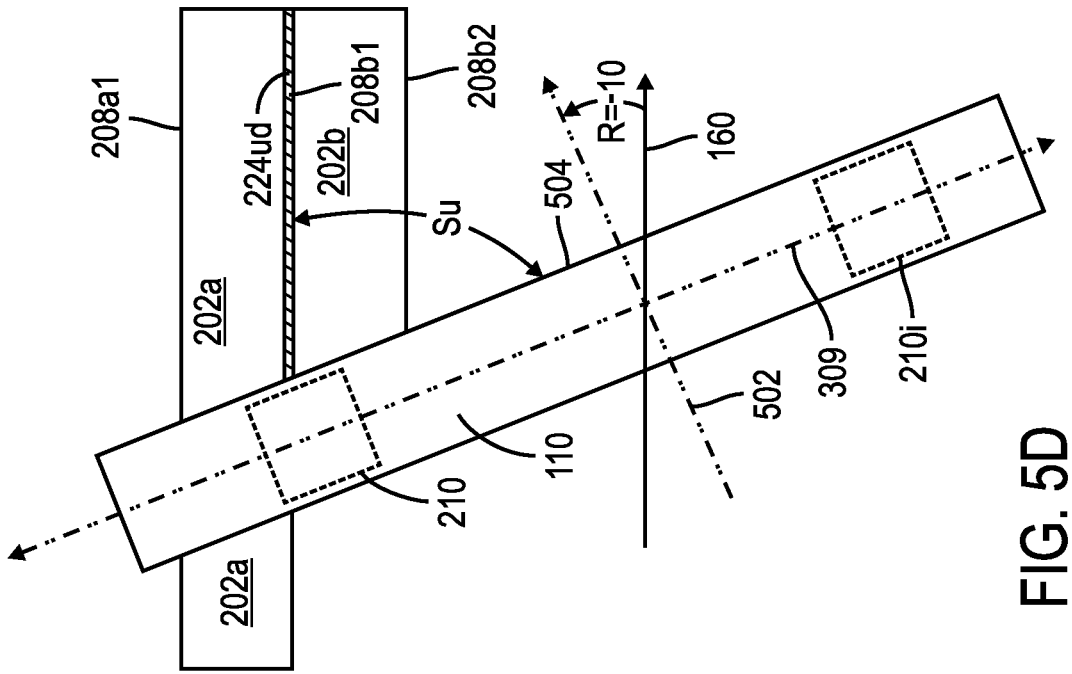

A schematic representation of one example of the upper portion of the outer outline of a write bubble believed to be produced by a magnetic field bridging a gap 308 between upper pole portions 310up1 and 310up2 of writer 210 at an obtuse skew angle such as $S_u$=100 degrees, for example, is indicated at 320a in FIG. 3A. In this example, the side erasing occurring in the previously written track 202a, combined with the forward motion of the tape, is believed to create the erase band 224ua between the shingled residual track 202a' and the track 202b having a width represented by a width W1, for a writer 210 oriented at an obtuse skew angle relative to the edge 312a of the residual track 202a' being overwritten by the currently written track 202b. The writer 210 of the examples of FIGS. 3A-3C is carried on a tape head 110 as shown in corresponding examples of FIGS. 5A-5C, respectively. In the example of FIGS. 3A, 5A, a central axis 502 (FIG. 5A) of the tape head 110 is rotated at a clockwise rotation angle R=+10 degrees, relative to a longitudinal tape forward motion direction vector 160f, which causes the tape head to be skewed at an obtuse angle relative to the erase bands and hence relative to the residual tracks being written. The tape head 110 has an array of writers of which just one column of writers 210 is represented in FIGS. 5A-5C for simplicity and clarity. The array of writers is typically arranged in columns disposed on or near the media facing surfaces of the tape head.

As previously mentioned, the upper skew angle Su may also be measured as the angle formed by the gap axis 309 of the gap 308 of a writer 210 relative to the longitudinal edge of the residual track 202a' being formed by that writer as the track 202b overwrites the previously written track 202a. In the illustrated embodiments of FIGS. 5A-5C, the gaps of each writer of a representative column of writers (represented by the writers 210, $210_i$) are aligned along the gap axis 309. As a result, the gap axis 309 for a column of writers 210, $210_i$, also defines a lateral axis of orientation of the tape head 110. Since the upper skew angle $S_u$ for a writer may be measured as the angle formed by the gap axis 309 of the gap 308 of the writer 210 relative to the longitudinal edge of the residual track 202a', the upper skew angle $S_u$ for the tape head may be measured as the angle formed by the lateral axis of the tape head as defined by the gap axis 309 of a column of writers 210, 210; relative to the longitudinal edge of the residual track 202a'. Hence in this embodiment, the upper skew angles of the tape head 110 in the examples of FIGS. 5A-5C match the corresponding upper skew angles of the writers 210 as depicted in the examples of FIGS. 3A-3C.

In one embodiment, the edges 504, 506 (FIGS. 5A-5C) of the tape head 110 are each oriented parallel to a tape head lateral axis as defined by the gap axis 309 of the column of writers 210, 210i. In the forward tape direction of tape travel, the edge 504 of the tape head 110 is the trailing edge. As such, the skew angle $S_u$ of the tape head 110 carrying the writers 210 may be measured as the angle between the trailing edge 504 (FIGS. 5A-5C) of the tape head 110 relative to the longitudinal edge of the residual track 202a' being formed by the overwriting track 202b.

As previously mentioned, the upper skew angles $S_u$ of the tape head 110 in the examples of FIGS. 5A-5C match the corresponding upper skew angles $S_u$ of the writer 210 as depicted in the examples of FIGS. 3A-3C. Thus, in the example of FIGS. 3A, 5A, the obtuse upper skew angle $S_u$ of the tape head 110 (FIG. 5A) matches that of the upper skew angle $S_u$ of the writer 210 as depicted in the example of FIG. 3A. As a result, in the obtuse upper skew angle $S_u$ example of FIGS. 3A, 5A, the side erasing occurring in the previously written track 202a, combined with the forward motion of the tape, is believed to create the erase band 224ua between the shingled residual track 202a' and the track 202b having a width represented by a width W1 for the tape head 110 oriented at an obtuse skew angle $S_u$.

By comparison, a schematic representation of one example of the upper portion of the outer outline of a write bubble believed to be produced by a magnetic field bridging a gap 308 between upper pole portions 310p1 and 310p2 of writer 210 at an orthogonal upper skew angle such as $S_u$=90 degrees, for example, is indicated at 320b in FIG. 3B. In this example, the side erasing occurring in the previously written track 202a and the residual track 202a', is believed to create an erase band 324ub between the shingled tracks 202a', 202b and having a width represented by a width W2 for a writer 210 oriented at an orthogonal upper skew angle relative to the edge 312b of the residual track 202a' being overwritten by the currently written track 202b. In the example of FIG. 3B, W2, the width of the erase band generated by an orthogonal skew angle as depicted in FIG. 3B is less than that of the width W1, which is the width of the erase band generated by an obtuse upper skew angle as depicted in FIG. 3A.

In the example of FIGS. 3B, 5B, the central axis 502 (FIG. 5B) of the tape head 110 (FIG. 5B) is rotated at a clockwise rotation angle R=0 degrees, relative to the longitudinal tape forward motion direction vector 160f. In other words, the central axis 502 (FIG. 5B) of the tape head 110 (FIG. 5B) is aligned or colinear to the longitudinal tape forward motion direction vector 160f. As a result, the tape head is oriented orthogonal to erase bands and hence the residual tracks being written.

As previously mentioned, the upper skew angles of the tape head 110 in the examples of FIGS. 5A-5C match the corresponding upper skew angles of the writer 210 as depicted in the examples of FIGS. 3A-3C. Thus, in the example of FIGS. 3B, 5B, the orthogonal upper skew angle $S_u$ of the tape head 110 (FIG. 5B) matches the orthogonal upper skew angle $S_u$ of the writer 210 as depicted in the example of FIG. 3B. As a result, in the orthogonal upper skew angle $S_u$ example of FIGS. 3B, 5B, the side erasing occurring in the previously written track 202a, combined with the forward motion of the tape, is believed to create the erase band 224ub between the shingled residual track 202a' and the track 202b having a more narrow width as represented by a width W2 for the tape head 110 oriented at an orthogonal skew angle $S_u$, as compared to the more wide width W1 for the tape head 110 oriented at an obtuse skew angle.

In yet another comparison, a schematic representation of one example of the upper portion of the outer outline of a write bubble believed to be produced by a magnetic field bridging a gap 308 between upper pole portions 310p1 and 310p2 of writer 210 at an acute upper skew angle such as $S_u$=80 degrees, for example, is indicated at 320c in FIG. 3C. In this example, the side erasing occurring in the previously written track 202a and its residual track 202a', is believed to create an erase band 324uc between the shingled tracks 202a', 202b having a width as represented by a width W3 where W3<W2<W1, where W2 and W1 are the widths of the erase bands generated by an obtuse upper skew angle as depicted in FIG. 3A, and an orthogonal upper skew angle as depicted in FIG. 3B, respectively.

In the example of FIGS. 3C, 5C, the central axis 502 (FIG. 5C) of the tape head 110 (FIG. 5C) is rotated at a counter-clockwise rotation angle R=−10 degrees, relative to the longitudinal tape forward motion direction vector 160f, which causes the lateral axis of the tape head to be skewed at an acute angle relative to the erase bands and hence relative to the residual tracks being written. As previously mentioned, the skew angles of the tape head 110 in the examples of FIGS. 5A-5C match the corresponding skew angles of the writer 210 as depicted in the examples of FIGS. 3A-3C. Thus, in the example of FIGS. 3C, 5C, the acute upper skew angle $S_u$ of the tape head 110 (FIG. 5C) matches the acute upper skew angle $S_u$ of the writer 210 as depicted in the example of FIG. 3C. As a result, in the acute upper skew angle $S_u$ example of FIGS. 3C, 5C, the side erasing occurring in the previously written track 202a, combined with the forward motion of the tape, is believed to create an erase band 224uc between the shingled residual track 202a' and the track 202b, which has a still more narrow width as represented by a width W3 for the tape head 110 oriented at an acute upper skew angle $S_u$, as compared to the more wide widths of the erase bands formed by the tape head 110 oriented at an orthogonal (FIG. 5B) or obtuse upper skew angle (FIG. 5A) relative to the longitudinal edge of the residual track 202a'. In one embodiment, the more narrow width W3 of erase bands formed by a writer or tape head oriented at an acute angle with respect to the longitudinal edge of the residual track, facilitates achieving a desired small track pitch notwithstanding the presence of erase bands between neighboring tracks.

As noted above, in the example of FIGS. 3C, 5C, the central axis 502 (FIG. 5C) of the tape head 110 (FIG. 5C) is rotated at a counter-clockwise (negative) rotation angle R=−10 degrees, relative to the longitudinal tape forward motion direction vector 160f, which causes the tape head to be skewed at an acute angle relative to the erase bands and hence relative to the residual tracks being written, to achieve a reduction in erase band width. By comparison, in some embodiments employing active skew control, a clockwise (positive) rotational angle R=+10 degrees may be selected for the tape head 110 as shown in FIG. 5A. However, as shown in FIGS. 3A, 5A, a clockwise (positive) rotational angle for the tape head 110 may cause the tape head and its writers to be skewed at an obtuse angle relative to the residual track remaining as the previously written track is being overwritten, resulting in an undesirable increase in error band width.

In one aspect of side erasure control in accordance with the present description, a clockwise rotational angle such as R=+10 degrees, for example may nonetheless be selected for active skew control of the tape head 110 and a decrease in erase band width achieved by side erasure control notwithstanding the clockwise (positive) rotational angle of the tape head. More specifically, it is noted that in the example of FIGS. 3A, 5A, the erase band 224ua being formed by the writer 210 between shingled tracks is formed at the top or upper lateral end of the writer poles P1, P2 in close proximity of the upper end of the write gap 308. In contrast, in the example of FIG. 6A, an erase band 224la being formed by the writer 210 between shingled tracks is formed at the bottom or lower lateral end of the writer poles P1, P2 in close proximity of the lower end of the write gap 308. More specifically, the erase band 224la is formed by the fringing fields emanating from the lower pole portions 310lp1, 310lp2 at the bottom or lower lateral end of the writer poles P1, P2 in close proximity of the lower end of the write gap 308.

Figure 7A:
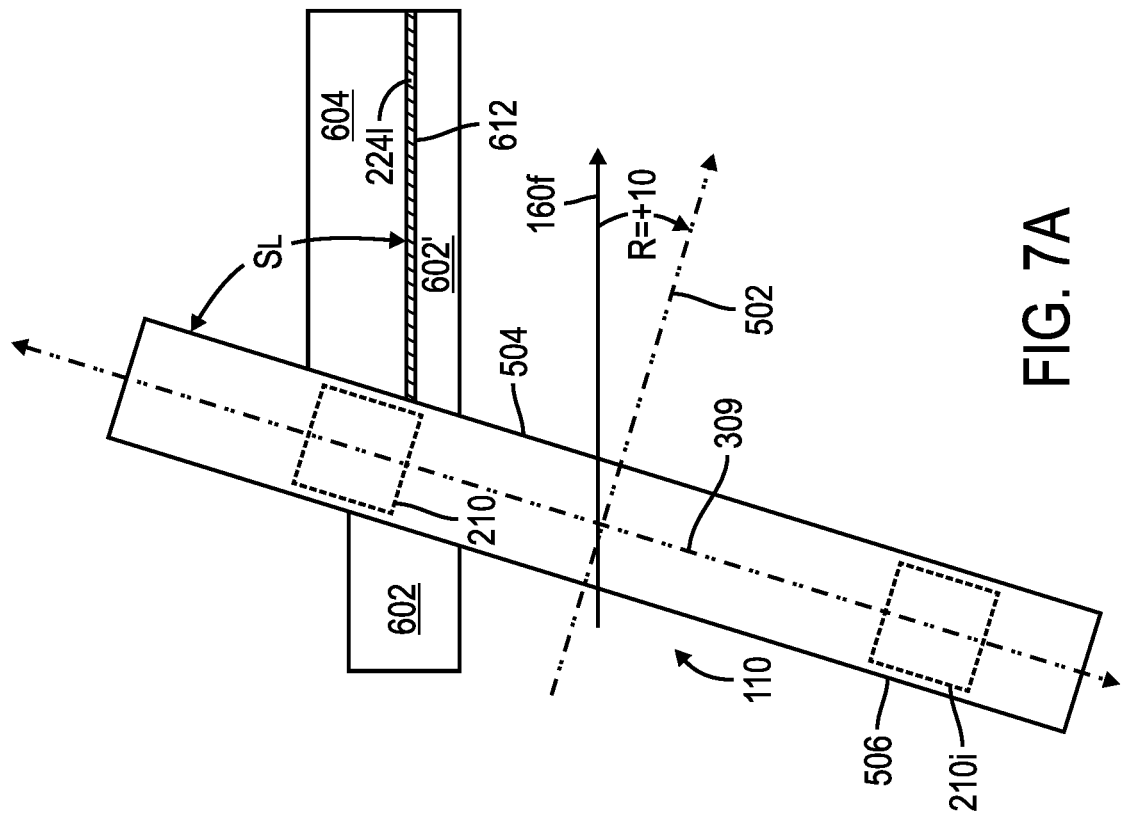
FIG. 7A depicts an example of a lower skew angle of a tape head for the writer of FIG. 6A, relative to the longitudinal edge of a residual track being formed.
Figure 6A:
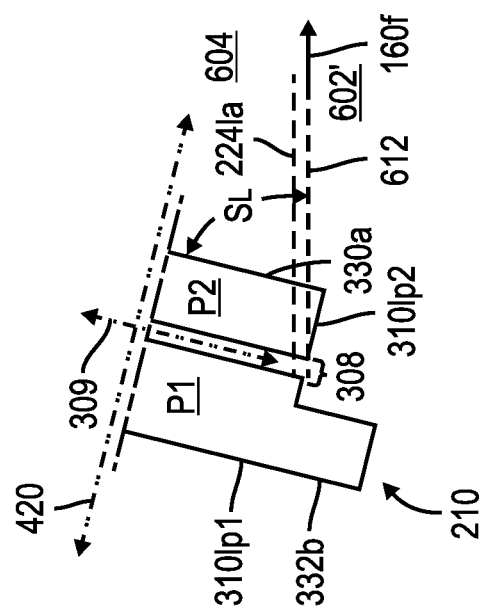
FIG. 6A depicts an example of a lower skew angle of a lower lateral end of a writer relative to the longitudinal edge of a residual track being formed.

In the example of FIGS. 6A, 7A, a previously written track 602 in the forward tape motion direction is being partially overwritten by a subsequent track 604 in the forward tape motion direction 160f with an erase band being formed between the track 604 (FIG. 7A) and the residual track 602'. The erase band is formed at the lower lateral end of the writer 210 by the fringing fields emanating from the lower portions 310lp1 (FIG. 6A), 310lp2 of the poles P1, P2, respectively, of the writer 210. Hence, in these examples, the erase band being formed in FIGS. 6A, 7A is referred to herein as a lower erase band 224l. In this embodiment, the lower skew angle represented as $S_L$ in FIGS. 6A, 7A of a writer 210 carried on the tape head 110, may be measured relative to the longitudinal edge 612 of the residual track 602' being formed. Since the edge 612 of the residual band 602a' results from the formation of a lower erase band, the skew angle $S_L$ of a writer 210 carried on the tape head 110 may also be measured relative to the longitudinal lower erase band 224l as shown in FIG. 6A and is referenced herein as the lower skew angle $S_L$ of the writer 210.

In the forward tape direction 160f of tape travel, the edge 504 (FIG. 7A) of the tape head 110 is the trailing edge. As such, the lower skew angle $S_L$ of the tape head 110 carrying the writers 210 may be measured as the angle between the trailing edge 504 (FIG. 7A) of the tape head 110 relative to the longitudinal edge 612 of the residual track 602' being formed by the overwriting track 202b. Similarly, in the forward tape direction of tape travel, the edge 330a (FIG. 6A) of the lower pole portion 310lp2 of the pole P2 of the writer 210 is the trailing edge of the writer 210. As such, the lower skew angle $S_L$ of the writer 210 may be measured as the angle between the trailing edge 330a of the writer relative to the longitudinal edge 612 of the residual track 622' or an edge of the lower erase band 224l being formed by the overwriting track 624.

In one aspect of side erasure control in accordance with the present description, for a tape head 110 rotated at a clockwise rotation angle (such as R=+10 degrees, for example) relative to the longitudinal direction 160f of tape motion, the lower skew angle $S_L$ of the writer 210 and the tape head carrying the writer 210, is an acute angle relative to the longitudinal edge 612 of the residual track 602' being formed. As a result, the width of the lower erase band 224l has a reduced width W3 similar to the reduced width W3 depicted for the acute angle of FIG. 3C, notwithstanding that positive, clockwise rotation angle (R=+10 degrees, for example) of the tape head 110 relative to the longitudinal direction of tape motion. As a result of the reduced width of the lower erase band 224l, the width of the residual shingled tracks may be increased for a given track pitch, for example. Alternatively, as a result of the reduced width of the lower erase band 224l, the pitch between adjacent residual tracks may be reduced while maintaining sufficient width of the residual tracks for reliable read and writing operations. It is appreciated that for a tape head 110 rotated at an acute clockwise rotation angle relative to the longitudinal direction 160f of tape motion, the lower skew angle $S_L$ of the writer 210 and the tape head carrying the writer 210, is an acute angle relative to the longitudinal edge 612 of the residual track 602' being formed where the lower skew angle $S_L$ is complementary to R, the tape head angle of rotation. Thus, $R+S_L=90$ degrees in this example. If, for example, the tape head 110 is rotated at a clockwise rotation angle R=+10 degrees, relative to the longitudinal direction 160f of tape motion, the lower skew angle $S_L$ of the writer 210 and the tape head carrying the writer 210, is at the acute angle $S_L=80$ degrees relative to the longitudinal edge 612 of the residual track 602' being formed, where the tape head rotation angle R and the lower skew angle $S_L$ of the writer 210 and the tape head carrying the writer 210, are complementary, As previously noted, FIGS. 6A, 7A depict an example of tracks being written in the forward tape motion. In writing tracks in wraps, the direction of tape motion is reversed after writing tracks in the forward tape motion direction, to write tracks in the reverse tape direction to complete a wrap. In the example of FIGS. 6A, 7A, the edge 330a (FIG. 6A) of the pole P2 is the trailing edge of the writer 210 in the forward direction of tape motion. Hence, track writing in the forward tape motion direction with the pole orientation of FIG. 6A is referred to herein as P2 trailing writing. To write tracks in the reverse tape motion direction, another writer module may be used in which the positions of the poles P1 and P2 may be swapped so as to maintain P2 trailing writing in the reverse tape motion direction.

Figure 7B:
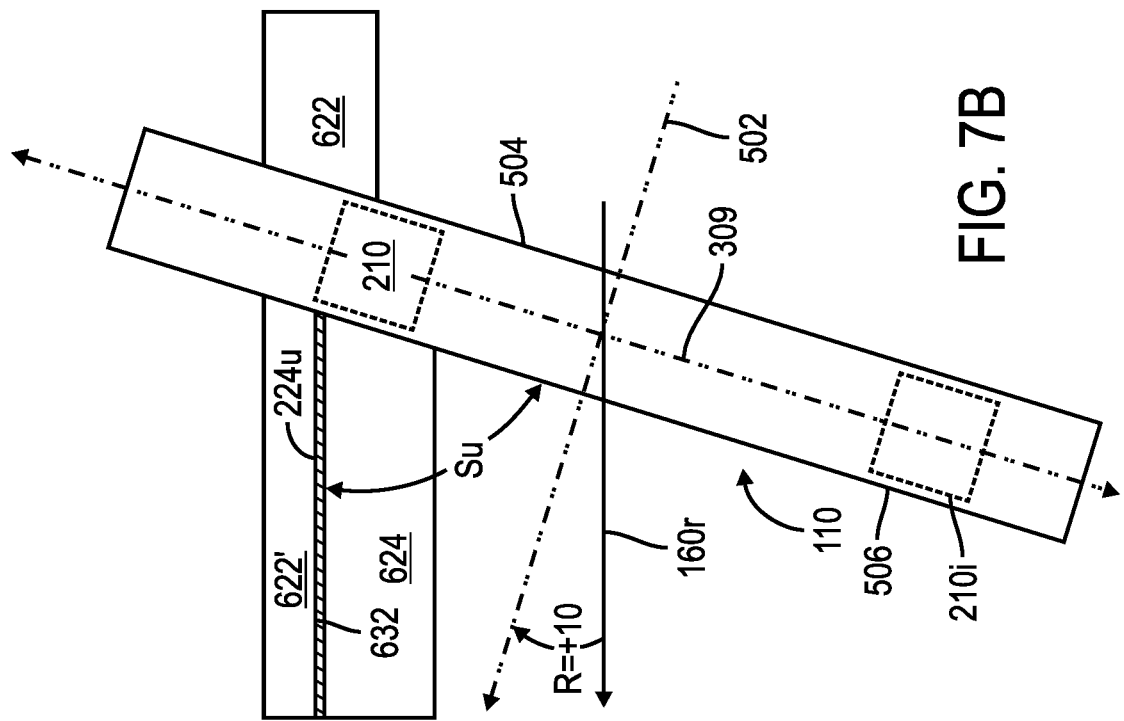
FIG. 7B depicts an example of an upper skew angle of a tape head for the writer of FIG. 6B, relative to the longitudinal edge of a residual track being formed.
Figure 6B:
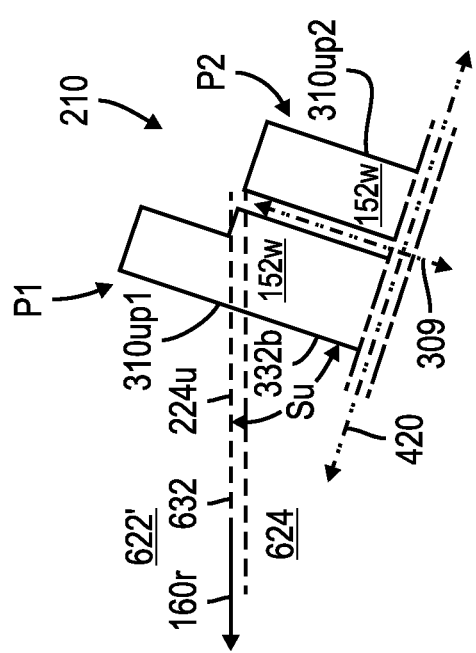
FIG. 6B depicts an example of an upper skew angle of an upper lateral end of a writer relative to the longitudinal edge of a residual track being formed.

FIGS. 6B, 7B depict an example in which the pole orientation of FIG. 6A is used to write tracks in the reverse tape motion direction. In this example, the edge 332b (FIG. 6B) is the trailing edge of the writer in the reverse direction of tape motion. Hence, track writing in the reverse direction of tape motion with the pole orientation of FIG. 6B is referred to herein as P1 trailing writing. To write tracks in the forward tape motion direction, another writer module may be used in which the positions of the poles P1 and P2 may be swapped so as to maintain P1 trailing writing in the forward tape motion direction.

In the example of FIGS. 6B, 7B, a previously written track 622 in the reverse tape motion direction 160r is being partially overwritten by a subsequent track 624 in the reverse tape motion direction with an erase band 224u being formed between the track 624 (FIG. 7A) and the residual track 622'. The erase band is formed at the upper lateral end of the writer 210 by the fringing fields emanating from the upper portions 310up1 (FIG. 6A), 310up2 of the poles P1, P2, respectively, of the writer 210. Hence, in these examples, the erase band being formed in FIGS. 6A, 7A is referred to herein as an upper erase band 224u.

In this embodiment, an upper skew angle represented as $S_u$ in FIGS. 6B, 7B of a writer 210 carried on the tape head 110, may be measured relative to the longitudinal edge 632 of the residual track 622' being formed. Since the edge 632 of the residual band 622a' results from the formation of an upper erase band 224u, the upper skew angle $S_u$ of a writer 210 carried on the tape head 110 may also be measured relative to the longitudinal upper erase band 224u as shown in FIGS. 6B, 7B and is referenced therein as the upper skew angle $S_u$ of the writer 210.

In the reverse tape direction 160r of tape travel, the edge 506 (FIG. 7B) of the tape head 110 is the trailing edge. As such, the upper skew angle $S_u$ of the tape head 110 carrying the writers 210 may be measured as the angle between the trailing edge 506 (FIG. 7B) of the tape head 110 relative to the longitudinal edge 632 of the residual track 622' being formed by the overwriting track 624. Similarly, in the reverse tape direction 160r of tape travel, the edge 332b (FIG. 6B) of the pole P1 of the writer 210 is the trailing edge. As such, the upper skew angle $S_u$ of the writer 210 may be measured as the angle between the trailing edge 332b of the writer 210 relative to the longitudinal edge 632 of the residual track 622' being formed by the overwriting track 624. In this embodiment, the trailing edge 332b of the pole P1 is like the pole P2 edge 330a (FIG. 6A), parallel to the gap axis 309 of the gap 308.

In one aspect of side erasure control in accordance with the present description, the upper skew angle $S_u$ of the writer 210 and the tape head 110 carrying the writer 210 is an acute angle relative to the longitudinal edge 632 of the residual track 622' being formed. As a result, the width of the upper erase band 224u again has a reduced width W3 (FIG. 3C) notwithstanding that positive, clockwise rotation angle (R=+10 degrees, for example) of the tape head 110 relative to the longitudinal direction of tape motion. Thus, the width of the residual shingled tracks may be increased for a given track pitch, for example. It is appreciated that for a tape head 110 rotated at an acute clockwise rotation angle R relative to the longitudinal direction 160r of tape motion, the upper skew angle $S_u$ of the writer 210 and the tape head carrying the writer 210, is an acute angle relative to the longitudinal edge 632 of the residual track 622' being formed where the upper skew angle $S_u$ is complementary to R, the tape head angle of rotation. Thus, $R+S_u=90$ degrees. If, for example, the tape head 110 is rotated at a clockwise rotation angle R=+10 degrees, relative to the longitudinal direction 160r of tape motion, the upper skew angle $S_u$ of the writer 210 and the tape head carrying the writer 210, is at the acute angle $S_L=80$ degrees relative to the longitudinal edge 632 of the residual track 622' being formed, where the tape head rotation angle R and the upper skew angle $S_u$ of the writer 210 and the tape head carrying the writer 210, are complementary.

FIG. 8A shows an example of a bi-directional serpentine pattern for writing data tracks to fill a data sub-band 800*al* (FIGS. 8A, 9A) of the tape 122. In this example, the writing of a first track 602 (FIG. 7A) in the forward tape direction is represented by an arrow 802*a1* and the writing of the next track 622 (FIG. 7B) in the reverse tape motion direction is represented by an arrow 802*a2*. In this example, the poles of the writer 210 depicted in both FIGS. 7A, 7B may be oriented for P2 trailing writing in both forward and reverse direction writing, or for P1 trailing writing in both forward and reverse direction writing, depending upon the particular application. The serpentine direction from the end of the previous forward tape direction track 602 to the beginning of the reverse tape direction track 622 (FIG. 7B) written below the previous forward tape direction track 602 (FIG. 7A) is in a clockwise direction as represented by a clockwise arrow CW1. Hence, the serpentine pattern of FIG. 8A is referred to herein as a clockwise pattern. The tracks 602 (FIG. 7A), 622 (FIG. 7B) are the first data tracks written in the data sub-band 800*al* and are centered above and below, respectively, the longitudinal center axis 810 of the interior of the data sub-band 800*al* instead of being written at the upper and lower outer edges 820*u*, 820*l*, respectively, of the data sub-band 800*al*. In this embodiment, the initial reverse tape direction track 622 (FIG. 7B) is written below the initial forward tape direction track 602 (FIG. 7A) and below the sub-band center axis 810.

Upon completion of the initial reverse tape direction track 622 (FIG. 7B), the next track written is the next forward tape direction track 604 (FIG. 7A) as represented by the arrow 802*a3*. The serpentine direction from the end of the previous reverse tape direction track 622 (FIG. 7B) to the beginning of the forward tape direction track 604 (FIG. 7A) continues in the clockwise direction as represented by a clockwise arrow CW2. The subsequent forward tape direction track 604 (FIG. 7A) as represented by the arrow 802*a3*, is written above the previously written forward tape direction track 602 (FIG. 7A) and partially overwrites the previously written forward tape direction track 602 leaving the residual track 602' (FIG. 7A) with the lower erase band 224*l* (FIG. 7A) between the shingled tracks 602', 604. Because the next forward tape direction track 604 (FIG. 7A) is written above the previously written forward tape direction inside track 602, such that the next forward tape direction track 604 is written father away from the center axis 810 and the interior of the sub-band, and closer to the upper outer edge 820*u* of the data sub-band 800*al* as compared to the previously written forward track 602, the serpentine pattern of FIG. 8A is referred to herein as an inside to outside serpentine pattern.

Upon completion of the forward tape direction track 604 (FIG. 7A), the next track written is the reverse tape direction track 624 (FIG. 7B) as represented by the arrow 802*a4*. The serpentine direction from the end of the previous forward tape direction track 604 to the beginning of the next reverse tape direction track 624 (FIG. 7B) continues in the clockwise direction as represented by a clockwise arrow CW3. The reverse tape direction track 624 (FIG. 7B) is written below the previously written reverse tape direction track 622 and partially overwrites the previously written reverse tape direction track 622 leaving the residual track 622' (FIG. 7B) with the upper erase band 224*u* (FIG. 7B) between the shingled tracks 622', 624. Because the next reverse tape direction track 624 (FIG. 7B) is written below the previously written reverse tape direction inside track 622, such that the next reverse tape direction track 624 is written farther away from the sub-band center axis 810 at its interior, and closer to the lower outer edge 820*l* of the data sub-band 800*a1*, the serpentine pattern of FIG. 8A is referred to herein as an inside to outside pattern, as noted above.

Figure 9A:
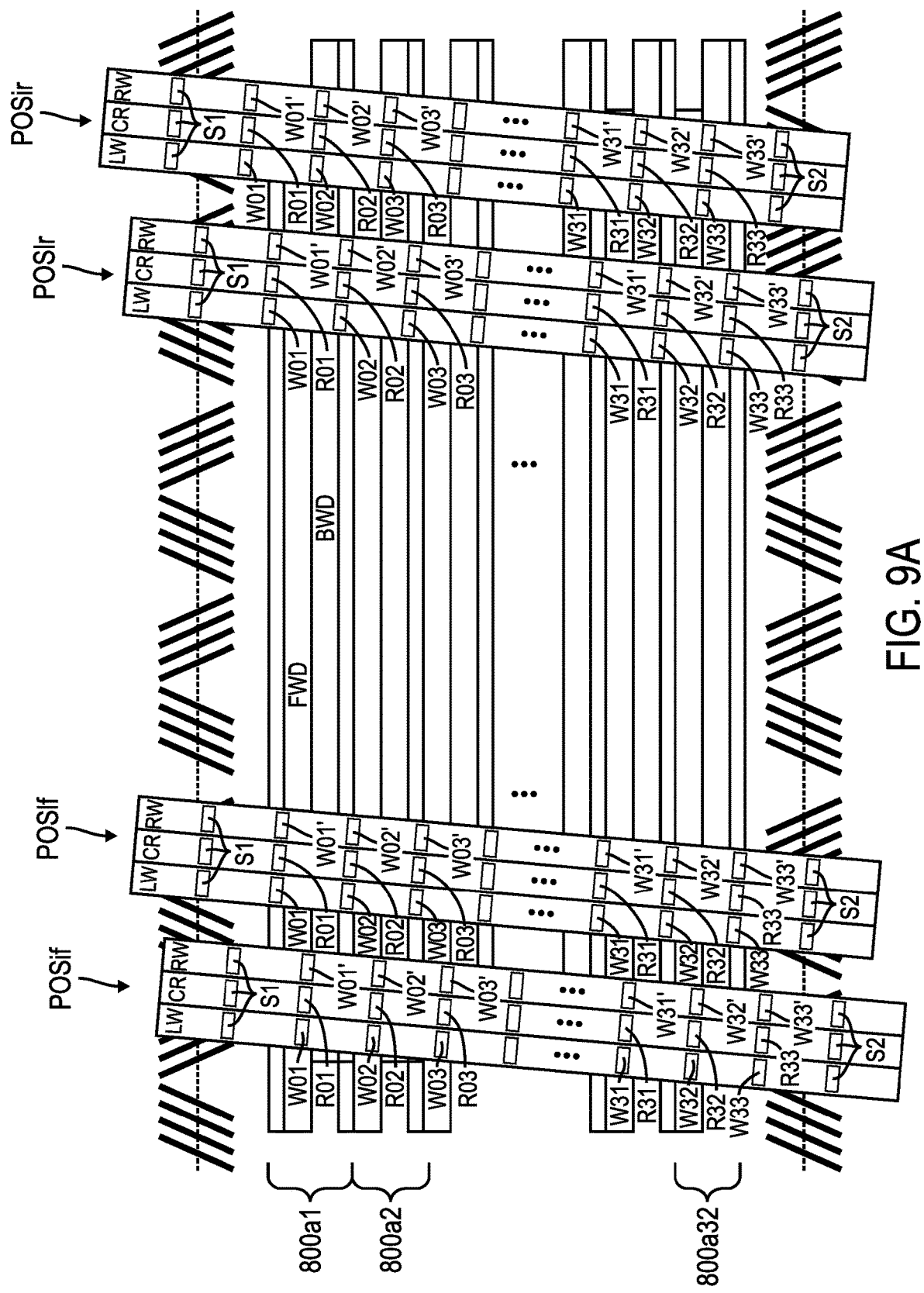
FIG. 9A depicts an example of a clockwise, inside to outside serpentine pattern for a data band employing side erasure control in shingled track writing in accordance with one embodiment of the present disclosure.

The writing of tracks, alternating between forward and reverse tape directions in a clockwise, inside to outside serpentine pattern, continues until the data sub-band 800*al* is filled as shown in FIG. 9A. The last forward tape direction track written at the upper outer edge 820*u* (FIG. 8A) of the data sub-band 800*al* is represented as forward tape direction track 840*u* (FIG. 8A) and the last reverse tape direction track written at the lower outer edge 820*l* (FIG. 8A) of the data sub-band 800*al* is represented as reverse tape direction track 840*l* (FIG. 8A). The last reverse tape direction track 840*l* written at the lower outer edge 820*l* (FIG. 8A) of the data sub-band 800*al* partially overwrites the first forward tape direction track of the next lower data sub-band 800*a2* as shown in FIG. 9A.

In the embodiment of FIG. 9A, the tape head 110 has three columns of transducers, including a left column of 33 writer transducers 210 (FIG. 7A) indicated at W01-W33, a middle column of 33 reader transducers R01-R33, and a right column of 33 writer transducers 210 (FIG. 7B) indicated at W01'-W33'. In this example, 32 forward tape direction tracks are written simultaneously by the top 32 left column writer transducers W01-W32 as the tape moves in the forward tape direction past the tape head 110, and 32 reverse tape direction tracks are written simultaneously by the bottom 32 right column writer transducers W02'-W033' as the tape moves in the reverse tape direction past the tape head 110. Thus, the tape head 110 has 32 data sub-bands 800*al*. 800*a2* . . . 800*a32* in each data band written by the tape head 110. The top 32 left column writer transducers W01-W32 each provide a write data channel coupled to the controller 128 (FIG. 1) via cables 130. Similarly the bottom 32 right column writer transducers W02'-W033' each also provide a write data channel coupled to the controller 128 (FIG. 1) via cables 130. The middle column reader transducers R01-R33 switch set from top to bottom depending upon the tape motion direction. The poles of the writer transducers W01-W33, W01'-W33', may be oriented as appropriate for P2 trailing writing in both tape motion directions, or oriented as appropriate for P1 trailing writing in both tape motion directions, depending upon the particular application.

The initial lateral position of the tape head when writing each initial forward tape direction track of the data sub-bands 800*a1*-800*a32* is indicated in FIG. 9A at lateral tape head position POSif which positions each left column writer transducer W01-W32 aligned above and adjacent the associated sub-band center axis 810 (FIG. 8A of the associated data sub-band 800*a1*-800*a32*, respectively, as described above in FIG. 8A for the data sub-band 800*al*. After completing the initial forward tape direction tracks of the data sub-bands 800*a1*-800*a32*, the tape head 110 is moved laterally upward to the initial lateral position of the tape head when writing each initial reverse tape direction track of the data sub-bands 800*a1*-800*a32*, which is indicated in FIG. 9A at lateral position POSir. Lateral tape head position POSir positions each right column writer transducer W02'-W33' aligned below and adjacent the sub-band center axis 810 of the data sub-bands 800*a1*-800*a32*, respectively, as described above in FIG. 8A for the data sub-band 800*al*, and below the previously written initial forward tape direction tracks of the associated data sub-band 800*a*1-800*a*32.

The writing of tracks in each data sub-band, alternating between forward and reverse tape directions in a clockwise, inside to outside serpentine pattern in each data sub-band, continues until each data sub-band is filled as shown in FIG. 9A. In one aspect of side erasure control in accordance with the present description, as each forward tape direction track is being written in each data sub-band in the clockwise, inside to outside serpentine pattern, the skew angle of the left column writer transducer W01-W32 for each data sub-band is skewed at an acute angle relative to the longitudinal edge of the residual track being formed in that data sub-band. As discussed above in connection with FIG. 7A for a writer 210 representing one of the left column writer transducers W01-W32, the writer 210 and the tape head 110 of FIG. 7A are oriented at a lower skew angle $S_L$ of the writer 210 and the tape head carrying the writer 210, which is skewed at an acute angle relative to the longitudinal edge 612 of the residual track 602' being formed. As a result, the width of the lower erase bands 224*l* of the data sub-bands have a reduced width W3 (FIG. 3C) notwithstanding that positive, clockwise rotation angle (R=+10 degrees, for example) of the tape head 110 relative to the longitudinal direction of tape motion. Thus, the width of the residual shingled tracks may be increased for a given track pitch due to the decrease in erase band width.

Similarly, as each reverse tape direction track is being written in each data sub-band in the clockwise, inside to outside serpentine pattern, the skew angle of the right column writer transducer W02'-W33' for each data sub-band is also skewed at an acute angle relative to the longitudinal edge of the residual track being formed in that data sub-band. As discussed above in connection with FIG. 7B for a writer 210 representing one of the right column writer transducers W02'-W33', the writer 210 and the tape head 110 of FIG. 7B both have an upper skew angle $S_U$ which is an acute angle relative to the longitudinal edge 632 of the residual track 622' being formed in each data sub-band. As a result, the width of the upper erase bands 224*u* formed in the data sub-bands also have a reduced width W3 (FIG. 3C) notwithstanding that positive, clockwise rotation angle (R=+ 10 degrees, for example) of the tape head 110 relative to the longitudinal reverse direction of tape motion. Here too, the width of the residual shingled tracks may be increased for a given track pitch due to the decrease in erase band width.

The lateral position of the tape head 110 when writing the last forward tape direction track of each data sub-band is indicated at tape head lateral position POSIf. The lateral position of the tape head 110 when writing the last reverse tape direction track of each data sub-band is indicated at tape head lateral position POSIr.

FIG. 8B shows another example of a bi-directional serpentine pattern for writing data tracks to fill a data sub-band 800*b*1 (FIGS. 8B, 9B) in which the tape head is rotated at a positive, that is, clockwise direction relative to the longitudinal direction of tape travel. In this example, the writing of the first track 602 (FIG. 7A) in the forward tape direction is represented by an arrow 802*b*1 and the writing of the next track 622 (FIG. 7B) in the reverse tape motion direction is represented by an arrow 802*b*2. The serpentine direction from the end of the previous forward tape direction track 602 to the beginning of the reverse tape direction track 622 (FIG. 7B) written above the previous forward tape direction track 602 (FIG. 7A) is in a counter-clockwise direction as represented by a counter-clockwise arrow CCW1. Hence, the serpentine pattern of FIG. 8B is referred to herein as a counter-clockwise pattern. The tracks 602 (FIG. 7A), 622 (FIG. 7B) are the first data tracks written in the data sub-band 800*b*1 and are written at the lower and upper outer edges 820*l*, 820*u*, respectively, of the data sub-band 800*b*1. As noted above, in this embodiment, the initial reverse tape direction track 624 (FIG. 7B) is written above the initial forward tape direction track 602 (FIG. 7A).

Upon completion of the reverse tape direction track 622 (FIG. 7B), the next track written is the next forward tape direction track 604 (FIG. 7A) as represented by the arrow 802*b*3. The serpentine direction from the end of the previous reverse tape direction track 622 (FIG. 7B) to the beginning of the next forward tape direction track 604 (FIG. 7A) continues in the counter-clockwise direction as represented by a counter-clockwise arrow CCW2. The subsequent forward tape direction track 604 (FIG. 7A) as represented by the arrow 802*b*3, is written above the previously written forward tape direction track 602 (FIG. 7A) and partially overwrites the previously written forward tape direction track 602 leaving the residual track 602' (FIG. 7A) with the lower erase band 224*l* (FIG. 7A) between the shingled tracks 602', 604. Because the next forward tape direction track 604 (FIG. 7A) is written above the previously written forward tape direction inside track 602, such that the next forward tape direction track 604 is written closer to the interior center axis 810 of the sub-band, and away from the lower outer edge 820*l* of the data sub-band 800*b*1 as compared to the previously written forward track 602, the serpentine pattern of FIG. 8B is referred to herein as an outside to inside serpentine pattern.

Upon completion of the forward tape direction track 604 (FIG. 7A), the next track written is the reverse tape direction track 624 (FIG. 7B) as represented by the arrow 802*b*4. The serpentine direction from the end of the previous forward tape direction track 604 to the beginning of the next reverse tape direction track 624 (FIG. 7B) continues in the counter-clockwise direction as represented by a counter-clockwise arrow CCW3. The reverse tape direction track 624 (FIG. 7B) is written below the previously written reverse tape direction track 622 and partially overwrites the previously written reverse tape direction track 622 leaving the residual track 622' (FIG. 7B) with the upper erase band 224*u* (FIG. 7B) between the shingled tracks 622', 624. Because the next reverse tape direction track 624 (FIG. 7B) is written below the previously written reverse tape direction inside track 622, such that the next reverse tape direction track 624 is written closer to the sub-band interior center axis 810 and farther away from the upper outer edge 820*u* of the data sub-band 800*b*1, the serpentine pattern of FIG. 8B is referred to herein as an outside to inside pattern, as noted above.

Figure 9B:
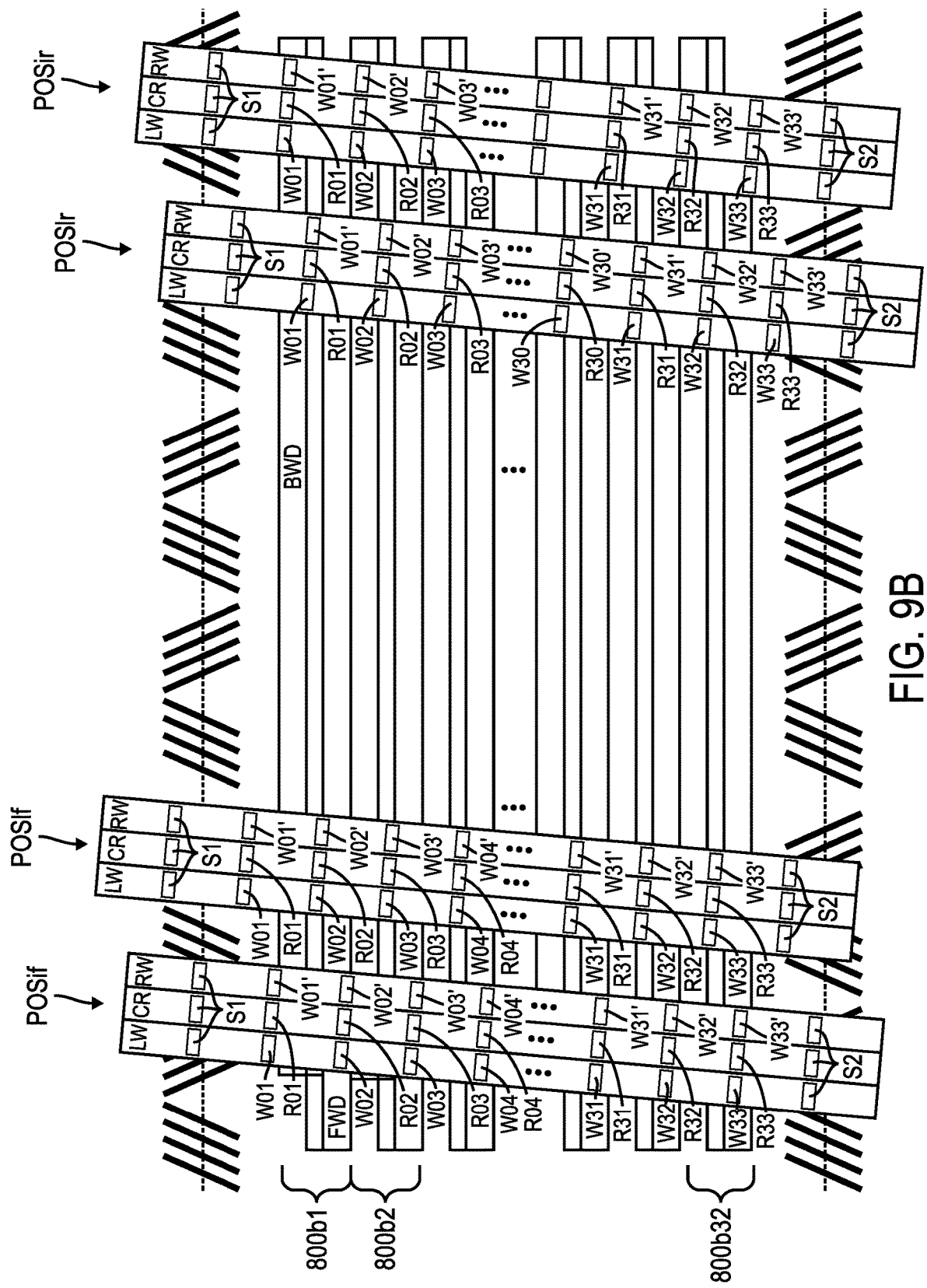
FIG. 9B depicts an example of a counter-clockwise, outside to inside serpentine pattern for a data band employing side erasure control in shingled track writing in accordance with one embodiment of the present disclosure.

The writing of tracks, alternating between forward and reverse tape direction in a counter-clockwise, outside to inside serpentine pattern, continues until the data sub-band 800*b*1 is filled as shown in FIG. 9B. The last forward tape direction track written below at the interior center axis 810 of the data sub-band 800*b*2 is represented as forward tape direction track 8501 (FIG. 8B) and the last reverse tape direction track written above and adjacent to the interior center line axis 810 of the data sub-band 800*b*1 is represented as reverse tape direction track 850*u* (FIG. 8B). The last reverse tape direction track 8401 written at the interior of the data sub-band 800*b*1 partially overwrites the last forward tape direction track 8501 of the data sub-band 800*b*1 as shown in FIG. 9B, such that an erase band between the last reverse tape direction track 8401 and the last forward tape direction track 8501 is formed along the interior center axis 810 of the data sub-band 800b1.

In the embodiment of FIG. 9B, in a manner similar to that of the embodiment of FIG. 9A, the tape head 110 has three columns of transducers, including a left column of 33 writer transducers 210 (FIG. 7A) indicated at W01-W33, a middle column of 33 reader transducers R01-R33, and a right column of 33 writer transducers 210 (FIG. 7B) indicated at W01'-W33'. In this example, 32 forward tape direction tracks are written simultaneously by the bottom 32 left column writer transducers W02-W33 as the tape moves in the forward tape direction past the tape head 110, and 32 reverse tape direction tracks are written simultaneously by the top 32 right column writer transducers W01'-W032' as the tape moves in the reverse tape direction past the tape head 110. Thus, the tape head 110 has 32 data sub-bands 800b1, 800b2 . . . 800b32 in each data band written by the tape head 110. The bottom 32 left column writer transducers W02-W33 each provide a write data channel coupled to the controller 128 (FIG. 1) via cables 130. Similarly the top 32 right column writer transducers W01'-W032' each also provide a write data channel coupled to the controller 128 (FIG. 1) via cables 130. The middle column reader transducers R01-R33 switch set from top to bottom depending upon the tape motion direction.

The initial lateral position of the tape head when writing each initial forward tape direction track of the data sub-bands 800b1-800b32 is indicated in FIG. 9B at tape head lateral position POSif which positions each left column writer transducer W02-W33 aligned with bottom edge 8201 (FIG. 8B) of the associated data sub-band 800b1-800b32, respectively, as described above in FIG. 8B for the data sub-band 800b1. After completing the initial forward tape direction tracks of the data sub-bands 800b1-800b32, the tape head 110 is moved laterally to the initial tape head lateral position POSir of the tape head when writing each initial reverse tape direction track of the data sub-bands 800b1-800b32. Lateral tape head position POSir positions each right column writer transducer W01'-W32' aligned with the top edge 820u (FIG. 8B) of the associated data sub-band 800b1-800b32, respectively, as described above in FIG. 8B for the data sub-band 800b1, to write the 32 reverse tape direction tracks.

The writing of tracks in cach data sub-band 800b1-800b32, alternating between forward and reverse tape directions in a counter-clockwise serpentine pattern and an outside to inside serpentine pattern continues in each data sub-band, in a manner similar to that described above for data sub-band 800b1 of FIG. 8B, until each data sub-band 800b1-800b32 is filled as shown in FIG. 9B. In one aspect of side erasure control in accordance with the present description, as each forward tape direction track is being written in each data sub-band in the counter-clockwise, outside to inside serpentine pattern, the skew angle of the left column writer transducer W02-W33 for cach data sub-band is skewed at an acute angle relative to the longitudinal edge of the residual track being formed in that data sub-band. As discussed above in connection with FIG. 7A for a writer 210 representing one of the left column writer transducers W02-W33, the writer 210 and the tape head 110 of FIG. 7A have a lower skew angle $S_L$ of the writer 210 and the tape head carrying the writer 210, which is an acute angle relative to the longitudinal edge 612 of the residual track 602' being formed. As a result, the width of the lower erase band 224l has a reduced width W3 (FIG. 3C) notwithstanding the positive, clockwise rotation angle (R=+10 degrees, for example) of the tape head 110 relative to the longitudinal direction of tape motion. Thus, the width of the residual shingled tracks may be increased for a given track pitch due to the decrease in erase band width, or the track pitch may be decreased, for example.

Similarly, as each reverse tape direction track is being written in each data sub-band in the counter-clockwise, outside to inside serpentine pattern, the skew angle of the right column writer transducer W01'-W32' for each data sub-band is also skewed at an acute angle relative to the longitudinal edge of the residual track being formed in that data sub-band. As discussed above in connection with FIG. 7B for a writer 210 representing one of the right column writer transducers W01'-W32', the writer 210 and the tape head 110 of FIG. 7B have an upper skew angle $S_u$ of the writer 210 and the tape head carrying the writer 210, which is an acute angle relative to the longitudinal edge 632 of the residual track 622' being formed. As a result, the width of the upper erase band 224u also has a reduced width W3 (FIG. 3C) notwithstanding the positive, clockwise rotation angle (R=+10 degrees, for example) of the tape head 110 relative to the longitudinal reverse direction of tape motion. Here too, the width of the residual shingled tracks may be increased for a given track pitch due to the decrease in erase band width, or the track pitch may be reduced, for example.

The lateral position of the tape head 110 when writing the last forward tape direction track of each data sub-band is indicated at POSIf. The lateral position of the tape head 110 when writing the last reverse tape direction track of each data sub-band is indicated at POSIr.

Figure 10:
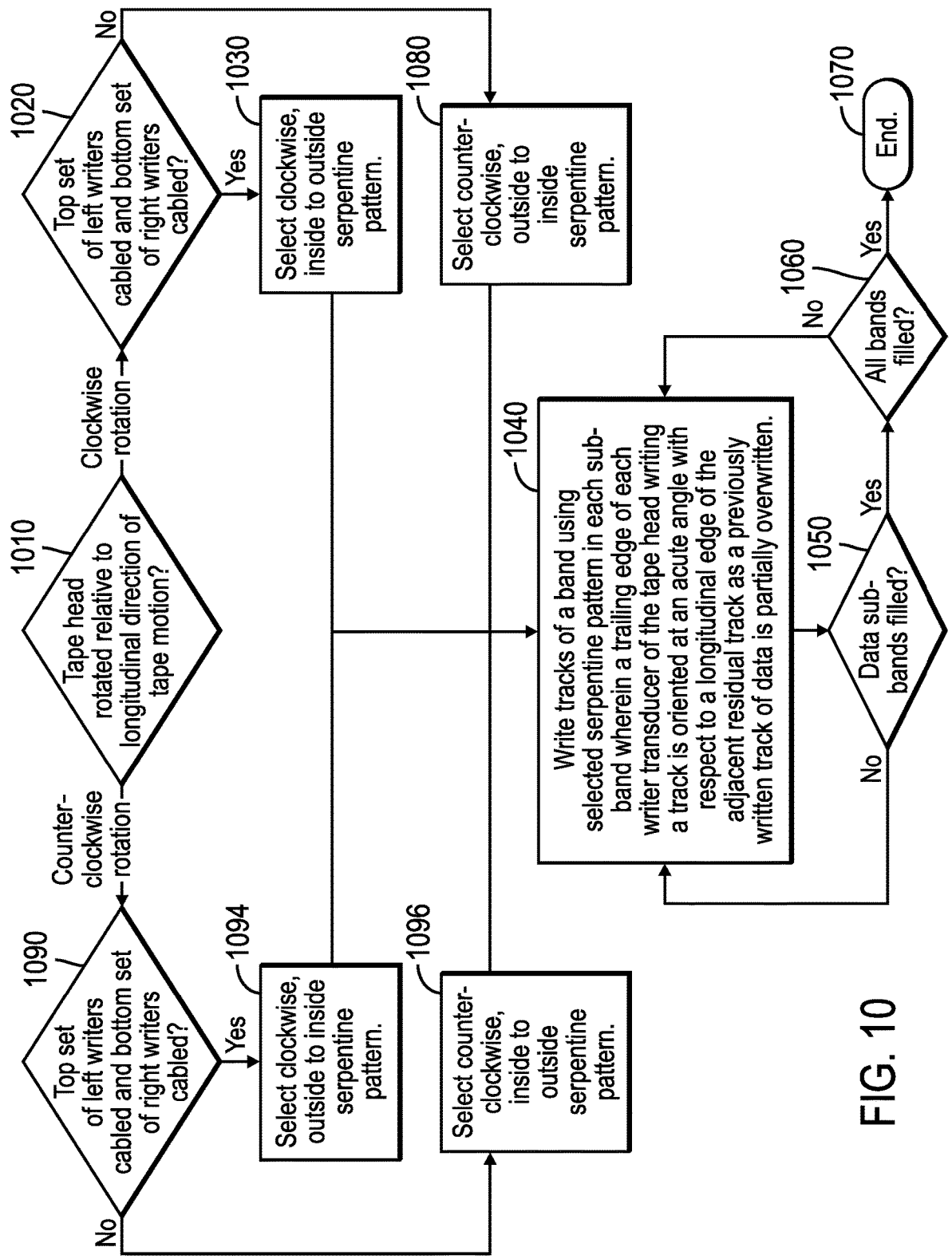
FIG. 10 is an example of operations of a tape drive employing side erasure control in shingled track writing in accordance with one embodiment of the present disclosure.

FIG. 10 depicts one example of tape drive operations of the tape drive controller 128 (FIG. 1) of a tape drive 100 employing one embodiment of side erasure control in accordance with the present description. As shown in FIG. 10, the tape drive operations of the controller 128 in this example are represented by blocks 1010-1096 of FIG. 10. It is appreciated that the number and types of operations of a tape drive controller 128 of a tape drive in accordance with embodiments of the present description, may vary, depending upon the particular application. Furthermore, operations may be performed in sequences other than those depicted in FIG. 10. For example, operations may be performed in reverse order or substantially in parallel, depending upon the particular application.

In the embodiment of FIG. 10, the operations include a determination (block 1010, FIG. 10) as to whether the tape head 110 is rotated relative to a longitudinal direction of tape motion and if so, in what direction. In this embodiment, the tape drive 100 also employs active skew control to facilitate active tape dimensional stability (TDS) control. Accordingly, in one example, the tape head 110 is rotated in a clockwise direction for purposes of active skew control as shown in the examples of FIGS. 7A and 7B.

Having determined that the tape head 110 of this example is rotated in a clockwise direction relative to a longitudinal direction of tape motion, a determination (block 1020, FIG. 10) is made as to the particular pattern in which the tape head 110 is cabled. As previously mentioned, in one cabling pattern depicted in FIG. 9A, the top 32 left column writer transducers W01-W32 each provide a write data channel coupled to the controller 128 (FIG. 1) via cables 130. Similarly the bottom 32 right column writer transducers W02'-W033' each also provide a write data channel coupled to the controller 128 (FIG. 1) via cables 130. By comparison in a second cabling pattern depicted in FIG. 9B, the bottom 32 left column writer transducers W02-W33 each provide a write data channel coupled to the controller 128 (FIG. 1) via cables 130. Similarly the top 32 right column writer transducers W01'-W032' each also provide a write data channel coupled to the controller 128 (FIG. 1) via cables 130.

In this example in which the tape head is determined (block 1010, FIG. 10) to be rotated clockwise, it is further determined (block 1020, FIG. 10) that the tape head is cabled in the same manner as that depicted in FIG. 9A such that the top 32 left column writer transducers W01-W32 are coupled to the controller 128 (FIG. 1) via cables 130 to provide 32 write data channels, and the bottom 32 right column writer transducers W02'-W033' are coupled to the controller 128 (FIG. 1) via cables 130 to provide 32 write data channels. Having determined (block 1020, FIG. 10) the cabling pattern of the tape head, a serpentine pattern for filling each data sub-band is selected (block 1030, FIG. 10), that is, the clockwise, inside to outside serpentine pattern depicted in FIG. 8A is selected (block 1030, FIG. 10), Having selected an appropriate serpentine pattern for the determined tape head rotation direction and the determined tape head cabling pattern, the tracks of the band are written (block 1040, FIG. 10) in a format, such as a shingled format for example, using the selected serpentine pattern. Moreover, the tracks are written in such a manner that the trailing edge of each writer transducer of the tape head writing a track in a sub-band, is oriented at an acute angle with respect to the longitudinal edge of the adjacent residual track as a previously written track of data is partially overwritten in a shingled format. FIGS. 6A, 7A show an example of a track 604 being written in a forward tape motion direction in a shingled format such that the trailing edge 330a of each writer transducer 210 representing one of the left column writer transducers W01-W32 (FIG. 9A) of the tape head 110 is oriented at an acute angle with respect to the longitudinal edge 612 of the adjacent residual track 602' as the previously written track 602 in the forward tape motion direction is partially overwritten. Similarly, FIGS. 6B, 7B show an example of a track 624 being written in a reverse tape motion direction in a shingled format such that the trailing edge 332b of each writer transducer 210 representing one of the writer transducers W02'-W033' of the tape head 110 is oriented at an acute angle with respect to the longitudinal edge 632 of the adjacent residual track 622' as the previously written track 602 in the forward tape motion direction is partially overwritten. Although some examples of track writing in FIG. 10 are directed to shingled track writing in which a previously written track is partially but substantially overwritten by an adjacent, subsequently written track, leaving a residual track, it is appreciated that side erasure control in accordance with the present description may be employed in non-shingled track writing in which a track being written adjacent to a previously written track does not substantially overwrite the previously written, adjacent track, as described in connection with FIG. 5D below, for example.

A determination (block 1050, FIG. 10) is made as to whether each data sub-band of the band has been filled with written tracks using the selected serpentine pattern. If not, the filling of the data sub-bands continues (block 1040, FIG. 10) until each data sub-band is filled. If so, a determination (block 1060, FIG. 10) is then made as to whether all the bands of the tape 122 have been filled. If not, the filling of the data sub-bands of another band is initiated (block 1040, FIG. 10) until each data sub-band is filled (block 1050, FIG. 10). Once all bands have been filled (block 1060, FIG. 10), the tape 122 has been filled and the operations are complete (block 1070, FIG. 10).

In another example, having determined (block 1010, FIG. 10) that the tape head 110 of this next example is also rotated in a clockwise direction relative to a longitudinal direction of tape motion, a determination (block 1020, FIG. 10) is made as to the particular pattern in which the tape head 110 is cabled. In this next example, it is determined (block 1020, FIG. 10) that the tape head is cabled in a second cabling pattern depicted in FIG. 9B, in which the bottom 32 left column writer transducers W02-W33 each provide a write data channel coupled to the controller 128 (FIG. 1) via cables 130, and the top 32 right column writer transducers W01'-W032' each also provide a write data channel coupled to the controller 128 (FIG. 1) via cables 130.

Having determined (block 1020, FIG. 10) that the tape head is cabled in the same manner as that depicted in FIG. 9B such that the bottom 32 left column writer transducers W02-W33 are coupled to the controller 128 (FIG. 1) via cables 130 to provide 32 write data channels, and the top 32 right column writer transducers W01'-W032' are coupled to the controller 128 (FIG. 1) via cables 130 to provide 32 write data channels, a serpentine pattern for filling each data sub-band is selected (block 1030, FIG. 10), that is, the counter-clockwise, outside to inside serpentine pattern depicted in FIG. 8B is selected (block 1080, FIG. 10), Having selected an appropriate serpentine pattern for the determined tape head rotation direction (clockwise in this example) and the determined tape head cabling pattern (pattern of FIG. 9B in this example), the tracks of the band are written (block 1040, FIG. 10) in a shingled format in this example, using the selected serpentine pattern. Here too, the shingled tracks are written in such a manner that the trailing edge of each writer transducer of the tape head writing a track in a sub-band, is oriented at an acute angle with respect to the longitudinal edge of the adjacent residual track as a previously written track of data is partially overwritten. FIGS. 6A, 7A show an example of a track 604 being written in a forward tape motion direction in a shingled format such that the trailing edge 330a of each writer transducer 210 representing one of the left column writer transducers W02-W33 (FIG. 9B) of the tape head 110 is oriented at an acute angle with respect to the longitudinal edge 612 of the adjacent residual track 602' as the previously written track 602 in the forward tape motion direction is partially overwritten. Similarly, FIGS. 6B, 7B show an example of a track 624 being written in a reverse tape motion direction in a shingled format such that the trailing edge 332b of each writer transducer 210 representing one of the writer transducers W01'-W032' (FIG. 9B) of the tape head 110 is oriented at an acute angle with respect to the longitudinal edge 632 of the adjacent residual track 622' as the previously written track 602 in the forward tape motion direction is partially overwritten.

Again, a determination (block 1050, FIG. 10) is made in this example as to whether each data sub-band of the band has been filled with written tracks using the selected serpentine pattern and a determination (block 1060, FIG. 10) is made as to whether all the bands of the tape 122 have been filled. Once all sub-bands of each band have been filled and all bands have been filled, the tape 122 has been filled and the operations are complete (block 1070, FIG. 10).

In yet another example, having determined (block 1010, FIG. 10) that the tape head 110 of this next example is rotated in a counter-clockwise direction relative to a longitudinal direction of tape motion as depicted in FIG. 5C, for example, a determination (block 1090, FIG. 10) is made as to the particular pattern in which the tape head 110 is cabled. In this next example, it is determined (block 1090, FIG. 10) that the tape head is cabled in a cabling pattern in which the top 32 left column writer transducers W01-W32 each provide a write data channel coupled to the controller 128 (FIG. 1) via cables 130, and the bottom 32 right column writer transducers W02'-W033' each also provide a write data channel coupled to the controller 128 (FIG. 1) via cables 130.

Having determined (block 1090, FIG. 10) that the tape head is cabled such that the top 32 left column writer transducers W01-W32 are coupled to the controller 128 (FIG. 1) via cables 130 to provide 32 write data channels, and the bottom 32 right column writer transducers W02'-W033' are coupled to the controller 128 (FIG. 1) via cables 130 to provide 32 write data channels, a serpentine pattern for filling each data sub-band is selected (block 1094, FIG. 10), that is, a clockwise, outside to inside serpentine pattern is selected (block 1094, FIG. 10), Having selected an appropriate serpentine pattern for the determined tape head rotation direction (counter-clockwise in this example) and the determined tape head cabling pattern (top 32 left writers and bottom 32 right writers), the tracks of the band are written (block 1040, FIG. 10) in a shingled format, in this example, using the selected serpentine pattern. Here too, the shingled tracks are written in such a manner that the trailing edge of each writer transducer of the tape head writing a track in a sub-band, is oriented at an acute angle with respect to the longitudinal edge of the adjacent residual track as a previously written track of data is partially overwritten. FIGS. 3C, 5C show an example of a track 202b being written in a forward tape motion direction in a shingled format such that the trailing edge 330a of each writer transducer 210 representing one of the left column writer transducers W01-W32 of the tape head 110 is oriented at an acute angle with respect to the longitudinal edge 312c of the adjacent residual track 202a' as the previously written track 202a in the forward tape motion direction is partially overwritten.

Again, a determination (block 1050, FIG. 10) is made in this example as to whether each data sub-band of the band has been filled with written tracks using the selected serpentine pattern and a determination (block 1060, FIG. 10) is made as to whether all the bands of the tape 122 have been filled. Once all sub-bands of each band have been filled and all bands have been filled, the tape 122 has been filled and the operations are complete (block 1070, FIG. 10).

In still another example, having determined (block 1010, FIG. 10) that the tape head 110 of this next example is rotated in a counter-clockwise direction relative to a longitudinal direction of tape motion as depicted in FIG. 5C, for example, a determination (block 1090, FIG. 10) is made as to the particular pattern in which the tape head 110 is cabled. In this next example, it is determined (block 1090, FIG. 10) that the tape head is cabled in a cabling pattern in which the bottom 32 left column writer transducers W02-W33 each provide a write data channel coupled to the controller 128 (FIG. 1) via cables 130, and the top 32 right column writer transducers W01'-W032' each also provide a write data channel coupled to the controller 128 (FIG. 1) via cables 130.

Having determined (block 1090, FIG. 10) that the tape head is cabled such that the bottom 32 left column writer transducers W02-W33 are coupled to the controller 128 (FIG. 1) via cables 130 to provide 32 write data channels, and the top 32 right column writer transducers W01'-W032' are coupled to the controller 128 (FIG. 1) via cables 130 to provide 32 write data channels, a serpentine pattern for filling each data sub-band is selected (block 1096, FIG. 10), that is, a counter-clockwise, insider to outside serpentine pattern is selected (block 1096, FIG. 10), Having selected an appropriate serpentine pattern for the determined tape head rotation direction (counter-clockwise in this example) and the determined tape head cabling pattern (bottom 32 left writers and top 32 right writers), the tracks of the band are written (block 1040, FIG. 10) in a shingled format, in this example, using the selected serpentine pattern. Here too, the shingled tracks are written in such a manner that the trailing edge of each writer transducer of the tape head writing a track in a sub-band, is oriented at an acute angle with respect to the longitudinal edge of the adjacent residual track as a previously written track of data is partially overwritten. FIGS. 3C, 5C show an example of a track 202b being written in a forward tape motion direction in a shingled format such that the trailing edge 330a of each writer transducer 210 representing one of the left column writer transducers W01-W32 of the tape head 110 is oriented at an acute angle with respect to the longitudinal edge 312c of the adjacent residual track 202a' as the previously written track 202a in the forward tape motion direction is partially overwritten.

Again, a determination (block 1050, FIG. 10) is made in this example as to whether each data sub-band of the band has been filled with written tracks using the selected serpentine pattern and a determination (block 1060, FIG. 10) is made as to whether all the bands of the tape 122 have been filled. Once all sub-bands of each band have been filled and all bands have been filled, the tape 122 has been filled and the operations are complete (block 1070, FIG. 10).

The tape head 110 is depicted and described in connection with FIGS. 9A, 9B and 10 as having a particular number of columns of transducers, a particular number of transducers in each column and particular patterns of cabling to provide a particular number of channels, for purposes of illustration. It is appreciated that the number of columns of transducers, the number of transducers in each column, the number and types of cabling patterns and the number of channels, may vary, depending upon the particular application. Furthermore, although certain embodiments described herein are directed to bi-directional track writing, it is appreciated that side erasure control in accordance with the present description may be employed in unidirectional track writing systems such as servo formatting systems, for example.

Figure 5D:
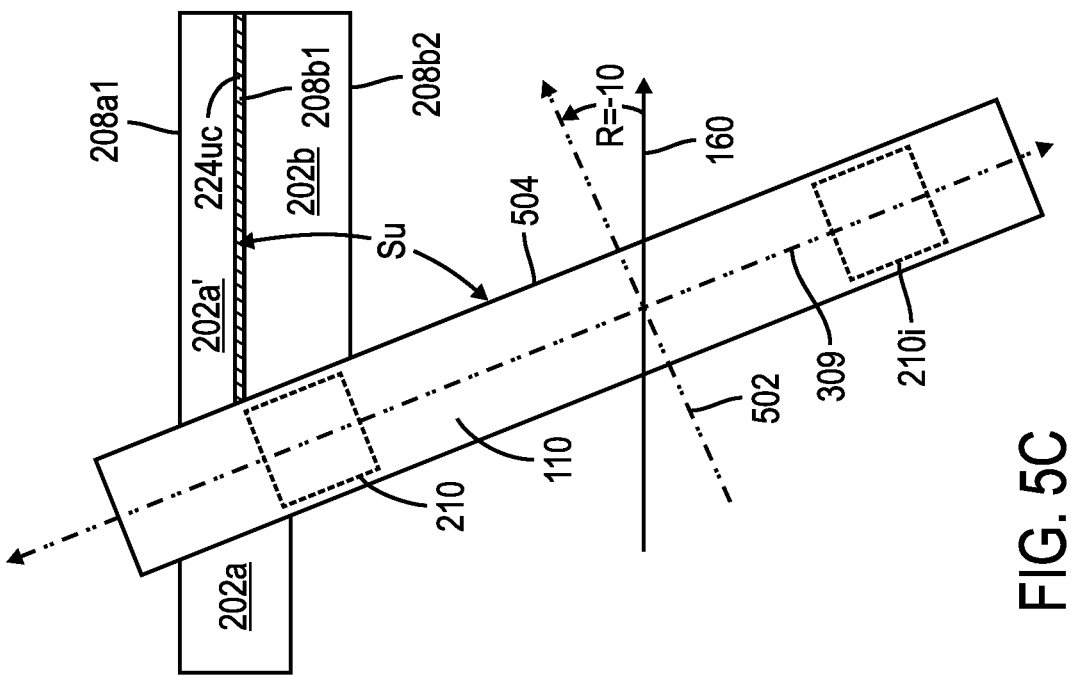
FIG. 5D illustrates an example of side erasure control as a function of skew angle between a tape head and non-shingled tracks being written by the tape head, in accordance with one embodiment of the present disclosure.

Still further, although certain embodiments described herein are directed to shingled track writing in which a previously written track is partially but substantially overwritten by an adjacent, subsequently written track, leaving a residual track, it is appreciated that side erasure control in accordance with the present description may be employed in non-shingled track writing in which a track being written adjacent to a previously written track does not substantially overwrite the previously written, adjacent track. For example, FIG. 5D shows an example of a track 202b being written adjacent to, but not substantially overlapping the previously written track 202a. As a result, the width of the previously written track 202a remains substantially the same as the subsequent track 202b is written adjacent to the track 202a. In the embodiment of FIG. 5D, the tracks 202a, 202b are spaced by an erase band 224ud being formed between the tracks 202a, 202b as the subsequent track 202b is being written. It is appreciated that in non-shingled track writing as that term is used herein, the erase band 224ud being formed between adjacent tracks 202a. 202b may fully or partially overlap the previously written track 202a such that the width of the previously written track 202a may be reduced by an erase band 224ud being formed between the tracks 202a, 202b as the subsequent track 202b is being written. In contrast, the subsequent track 202b does not substantially overlap the adjacent previously written track 202a in the non-shingled track writing example of FIG. 5D.

In this example, the trailing edge 504 of the tape head 110 forms an acute upper skew angle $S_u$ relative to the top longitudinal edge 208b1 of the track 202b being written adjacent to, but not substantially overlapping the previously written track 202a. As a result, in a manner similar to that described above in connection with the shingled track writing examples of FIGS. 3C, 5C, the erase band 224ud is believed to exhibit a more narrow width (as represented by a width W3 for the erase band 224uc in the shingled track writing example of FIG. 3C), as compared to the more wide widths of the erase bands formed by the tape head 110 oriented at an orthogonal (FIG. 5B) or obtuse upper skew angle (FIG. 5A) relative to the longitudinal edge of the residual track 202a' in shingled track writing examples. In one embodiment, the more narrow width W3 of erase bands formed by a writer or tape head oriented at an acute angle with respect to the longitudinal edge of the track being written, facilitates achieving a desired small track pitch notwithstanding the presence of erase bands between neighboring, adjacent tracks.

In one embodiment of side erasure control in accordance with the present description, the tape head is rotated relative to the longitudinal direction of tape motion within a range of 1 to 45 degrees in a clockwise direction relative to the longitudinal direction of tape motion. In such an embodiment, a trailing edge of the writer transducer of the tape head writing a linear track of data forms a complementary acute angle within a range of 89 to 45 degrees, respectively, with respect to a longitudinal edge of the linear track as the linear track is being written. In another embodiment of side erasure control in accordance with the present description, the tape head is rotated relative to the longitudinal direction of tape motion within a range of 5 to 15 degrees in a clockwise direction relative to the longitudinal direction of tape motion. In such an embodiment, a trailing edge of the writer transducer of the tape head writing a linear track of data forms a complementary acute angle within a range of 85 to 75 degrees, respectively, with respect to a longitudinal edge of the linear track as the linear track is being written.

In another embodiment of side erasure control in accordance with the present description, the tape head is rotated relative to the longitudinal direction of tape motion within a range of −5 to −15 degrees (a counter-clockwise direction) relative to the longitudinal direction of tape motion. In such an embodiment, a trailing edge of the writer transducer of the tape head writing a linear track of data forms a complementary acute angle within a range of −85 to −75 degrees, respectively, with respect to a longitudinal edge of the linear track as the linear track is being written.

The controller 128 and the computer 140 of FIG. 1 are described as performing various logic functions. In one embodiment, the controller 128 and the computer 140 includes processors which cause operations which perform the various logic functions. Alternatively, one or more of these logic functions may be performed by one or more of programmed centralized processors such as central processing units (CPUs) and programmed distributed processors such as integrated circuit logic devices such as Application Specific Integrated Circuit (ASIC) devices, for example. Programming of such hardware may be provided by one or more of software and firmware alone or in combination, and stored in a memory of the controller 128. In other embodiments, some or all of the logic functions of the controller 128 and computer 140 may be performed by dedicated or hard-wired logic circuitry.

One or more of the controller 128 and computer 140 may be implemented as program modes which may comprise routines, programs, objects, components, logic, data structures, and so on that perform particular tasks or implement particular abstract data types. The program components and hardware devices of the tape drive 100 of FIG. 1 may be implemented in one or more computer systems, where if they are implemented in multiple computer systems, then the computer systems may communicate over a network.

The present invention may be a system, device, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing g. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for a system for writing tracks of data on magnetic tape, the system having a processor and a tape head which has at least one writer transducer, wherein the computer program product comprises a computer readable storage medium having program instructions embodied therewith, the program instructions executable by a processor to cause operations, the operations comprising:
    using a writer transducer of the tape head, writing a first linear track of data on the magnetic tape moving in a first linear direction; and
    using a writer transducer of the tape head, writing a second linear track of data adjacent to the first linear track on the magnetic tape moving in the first linear direction of tape motion and forming a first erase band as the second linear track of data is being written;
    wherein the tape head is rotated at a non-zero angle relative to the first linear direction of tape motion as the second linear track of data is being written, and wherein a trailing edge of the writer transducer of the tape head writing the second linear track of data forms an acute angle with respect to a longitudinal edge of the second linear track as the second linear track is being written.

2. The computer program product of claim 1 wherein writing the second linear track of data adjacent to the first linear track includes writing the second linear track of data so that the second linear track of data is partially overlapping the previously written first track of data to shingle the second linear track of data on the previously written first track of data, leaving a first residual track of the previously written first track of data and forming the first erase band between the first residual track and the second linear track of data, and wherein a trailing edge of the writer transducer of the tape head writing the second linear track of data forms an acute angle with respect to a longitudinal edge of the first residual track as the previously written first track of data is partially overwritten.

3. The computer program product of claim 1 wherein writing the second linear track of data adjacent to the first linear track includes rotating the tape head relative to the first linear direction of tape motion at an angle within one of 1) a range of 5 to 15 degrees and limiting the acute angle of the trailing edge of the writer transducer of the tape head with respect to the longitudinal edge of the second linear track, within a range of 85 to 75 degrees, respectively, and 2) a range of −5 to −15 degrees and limiting the acute angle of the trailing edge of the writer transducer of the tape head with respect to the longitudinal edge of the second linear track, within a range of −85 to −75 degrees, respectively.

4. The computer program product of claim 1 further comprising:
    using a writer transducer of the tape head, writing a third linear track of data on the magnetic tape moving in a second linear direction opposite to that of the first linear direction; and
    using a writer transducer of the tape head, writing a fourth linear track of data on the magnetic tape moving in the second linear direction, adjacent to the third linear track on the magnetic tape moving in the second linear direction of tape motion and forming a second erase band as the fourth linear track of data is being written;
    wherein the tape head is rotated at a non-zero angle relative to the second linear direction of tape motion, and wherein a trailing edge of the writer transducer of the tape head writing the fourth linear track of data forms an acute angle with respect to a longitudinal edge of the fourth linear track as the fourth linear track is being written.

5. The computer program product of claim 1 wherein the writer transducer includes a first pole and a second pole which define a gap between the first pole and the second pole, wherein the writer transducer has a trailing edge which is one of 1) a trailing edge of the first pole, and 2) a trailing edge of the second pole, as the second linear track of data is being written.

6. The computer program product of claim 4 wherein the tape head is rotated in a clockwise direction at a non-zero angle relative to the first linear direction of tape motion, the operations further comprising filling a data sub-band with tracks written in one of 1) a clockwise, inside to outside bi-directional serpentine pattern and 2) a counter-clockwise, outside to inside bi-directional serpentine pattern.

7. The computer program product of claim 4 wherein the tape head is rotated in a counter-clockwise direction at a non-zero angle relative to the first linear direction of tape motion, the operations further comprising filling a data sub-band with tracks written in one of 1) a clockwise, outside to inside bi-directional serpentine pattern, and 2) a counter-clockwise, inside to outside bi-directional serpentine pattern.

8. A system, comprising:
a tape head having at least one writer transducer;
a controller configured to control the tape head, the controller having at least one processor; and
a computer program product which comprises a computer readable storage medium having program instructions embodied therewith, the program instructions executable by a processor to cause operations, the operations comprising:
using a writer transducer of the tape head, writing a first linear track of data on the magnetic tape moving in a first linear direction; and
using a writer transducer of the tape head, writing a second linear track of data adjacent to the first linear track on the magnetic tape moving in the first linear direction of tape motion and forming a first erase band as the second linear track of data is being written;
wherein the tape head is rotated at a non-zero angle relative to the first linear direction of tape motion as the second linear track of data is being written, and wherein a trailing edge of the writer transducer of the tape head writing the second linear track of data forms an acute angle with respect to a longitudinal edge of the second linear track as the second linear track is being written.

9. The system of claim 8 wherein writing the second linear track of data adjacent to the first linear track includes writing the second linear track of data so that the second linear track of data is partially overlapping the previously written first track of data to shingle the second linear track of data on the previously written first track of data, leaving a first residual track of the previously written first track of data and forming the first erase band between the first residual track and the second linear track of data, and wherein a trailing edge of the writer transducer of the tape head writing the second linear track of data forms an acute angle with respect to a longitudinal edge of the first residual track as the previously written first track of data is partially overwritten.

10. The system of claim 8 wherein writing the second linear track of data adjacent to the first linear track includes rotating the tape head relative to the first linear direction of tape motion at an angle within one of 1) a range of 5 to 15 degrees and limiting the acute angle of the trailing edge of the writer transducer of the tape head with respect to the longitudinal edge of the second linear track, within a range of 85 to 75 degrees, respectively, and 2) a range of −5 to −15 degrees and limiting the acute angle of the trailing edge of the writer transducer of the tape head with respect to the longitudinal edge of the second linear track, within a range of −85 to −75 degrees, respectively.

11. The system of claim 8 further comprising:
using a writer transducer of the tape head, writing a third linear track of data on the magnetic tape moving in a second linear direction opposite to that of the first linear direction; and
using a writer transducer of the tape head, writing a fourth linear track of data on the magnetic tape moving in the second linear direction, adjacent to the third linear track on the magnetic tape moving in the second linear direction of tape motion and forming a second erase band as the fourth linear track of data is being written;
wherein the tape head is rotated at a non-zero angle relative to the second linear direction of tape motion, and wherein a trailing edge of the writer transducer of the tape head writing the fourth linear track of data forms an acute angle with respect to a longitudinal edge of the fourth linear track as the fourth linear track is being written.

12. The system of claim 8 wherein the writer transducer includes a first pole and a second pole which define a gap between the first pole and the second pole, wherein the writer transducer has a trailing edge which is one of 1) a trailing edge of the first pole, and 2) a trailing edge of the second pole, as the second linear track of data is being written.

13. The system of claim 11 wherein the tape head is rotated in a clockwise direction at a non-zero angle relative to the first linear direction of tape motion, the operations further comprising filling a data sub-band with tracks written in one of 1) a clockwise, inside to outside bi-directional serpentine pattern and 2) a counter-clockwise, outside to inside bi-directional serpentine pattern.

14. The system of claim 11 wherein the tape head is rotated in a counter-clockwise direction at a non-zero angle relative to the first linear direction of tape motion, the operations further comprising filling a data sub-band with tracks written in one of 1) a clockwise, outside to inside bi-directional serpentine pattern, and 2) a counter-clockwise, inside to outside bi-directional serpentine pattern.

15. A method for operating a system for magnetic tape and having a tape head having at least one writer transducer, comprising:
using a writer transducer of the tape head, writing a first linear track of data on the magnetic tape moving in a first linear direction; and
using a writer transducer of the tape head, writing a second linear track of data adjacent to the first linear track on the magnetic tape moving in the first linear direction of tape motion and forming a first erase band as the second linear track of data is being written;
wherein the tape head is rotated at a non-zero angle relative to the first linear direction of tape motion as the second linear track of data is being written, and wherein a trailing edge of the writer transducer of the tape head writing the second linear track of data forms an acute angle with respect to a longitudinal edge of the second linear track as the second linear track is being written.

16. The method of claim 15 wherein writing the second linear track of data adjacent to the first linear track includes writing the second linear track of data so that the second linear track of data is partially overlapping the previously written first track of data to shingle the second linear track of data on the previously written first track of data, leaving a first residual track of the previously written first track of data and forming the first erase band between the first residual track and the second linear track of data, and wherein a trailing edge of the writer transducer of the tape head writing the second linear track of data forms an acute angle with respect to a longitudinal edge of the first residual track as the previously written first track of data is partially overwritten.

17. The method of claim 15 wherein writing the second linear track of data adjacent to the first linear track includes rotating the tape head relative to the first linear direction of tape motion at an angle within one of 1) a range of 5 to 15 degrees and limiting the acute angle of the trailing edge of the writer transducer of the tape head with respect to the longitudinal edge of the second linear track, within a range of 85 to 75 degrees, respectively, and 2) a range of −5 to −15 degrees and limiting the acute angle of the trailing edge of the writer transducer of the tape head with respect to the longitudinal edge of the second linear track, within a range of −85 to −75 degrees, respectively.

18. The method of claim 15 further comprising:
using a writer transducer of the tape head, writing a third linear track of data on the magnetic tape moving in a second linear direction opposite to that of the first linear direction; and
using a writer transducer of the tape head, writing a fourth linear track of data on the magnetic tape moving in the second linear direction, adjacent to the third linear track on the magnetic tape moving in the second linear direction of tape motion and forming a second erase band as the fourth linear track of data is being written;
wherein the tape head is rotated at a non-zero angle relative to the second linear direction of tape motion, and wherein a trailing edge of the writer transducer of the tape head writing the fourth linear track of data forms an acute angle with respect to a longitudinal edge of the fourth linear track as the fourth linear track is being written.

19. The method of claim 15 wherein the writer transducer includes a first pole and a second pole which define a gap between the first pole and the second pole, wherein the writer transducer has a trailing edge which is one of 1) a trailing edge of the first pole, and 2) a trailing edge of the second pole, as the second linear track of data is being written.

20. The method of claim 18 wherein the tape head is rotated in a clockwise direction at a non-zero angle relative to the first linear direction of tape motion, the method further comprising filling a data sub-band with tracks written in one of 1) a clockwise, inside to outside bi-directional serpentine pattern and 2) a counter-clockwise, outside to inside bi-directional serpentine pattern.

* * * * *